United States Patent
Akahane

(10) Patent No.: US 12,139,140 B2
(45) Date of Patent: Nov. 12, 2024

(54) DRIVING ASSISTANCE DEVICE

(71) Applicant: TOYOTA JIDOSHA KABUSHIKI KAISHA, Toyota (JP)

(72) Inventor: Satoru Akahane, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 262 days.

(21) Appl. No.: 17/693,507

(22) Filed: Mar. 14, 2022

(65) Prior Publication Data

US 2022/0289192 A1  Sep. 15, 2022

(30) Foreign Application Priority Data

Mar. 15, 2021 (JP) ................................ 2021-041607

(51) Int. Cl.
| | |
|---|---|
| *B60W 30/16* | (2020.01) |
| *B60W 10/18* | (2012.01) |
| *B60W 30/12* | (2020.01) |
| *B60W 30/14* | (2006.01) |
| *B60W 30/18* | (2012.01) |

(52) U.S. Cl.
CPC ............ *B60W 30/16* (2013.01); *B60W 10/18* (2013.01); *B60W 30/12* (2013.01); *B60W 30/143* (2013.01); *B60W 30/18163* (2013.01); *B60W 2520/105* (2013.01); *B60W 2554/802* (2020.02); *B60W 2554/804* (2020.02); *B60W 2720/106* (2013.01); *B60W 2754/30* (2020.02)

(58) Field of Classification Search
None
See application file for complete search history.

(56) References Cited

U.S. PATENT DOCUMENTS

| | | | |
|---|---|---|---|
| 11,186,279 B2 | 11/2021 | Fukuda et al. | |
| 2012/0078484 A1* | 3/2012 | Kato | B60W 30/18163 701/96 |
| 2017/0123430 A1* | 5/2017 | Nath | G05D 1/021 |
| 2017/0183013 A1 | 6/2017 | Matsumoto et al. | |
| 2017/0327114 A1* | 11/2017 | Saito | B60W 30/18 |
| 2019/0168757 A1* | 6/2019 | Tokimasa | B60W 40/02 |
| 2022/0041162 A1* | 2/2022 | Arita | B60W 30/162 |

FOREIGN PATENT DOCUMENTS

| | | | |
|---|---|---|---|
| JP | 2002-127782 A | 5/2002 | |
| JP | 2017-114431 A | 6/2017 | |
| JP | 2017-202742 A | 11/2017 | |
| JP | 2018-103833 A | 7/2018 | |
| JP | 2019-018694 A | 2/2019 | |

* cited by examiner

*Primary Examiner* — Christian Chace
*Assistant Examiner* — Shayne M. Gilbertson
(74) *Attorney, Agent, or Firm* — Oliff PLC

(57) ABSTRACT

A driving assistance device includes one or more processors configured to control operation of a host vehicle. The one or more processors are configured to perform first following control controlling acceleration and deceleration of the host vehicle so that the host vehicle follows a first preceding vehicle running in front of the host vehicle in the same lane as the host vehicle, and perform second following control prohibiting the first following control while a lane change is being performed and controlling acceleration and deceleration of the host vehicle so that the host vehicle follows a second preceding vehicle running in front of the host vehicle in a destination lane, if the lane change of the host vehicle is started during the first following control.

6 Claims, 15 Drawing Sheets

LANE BOUNDARY LINE

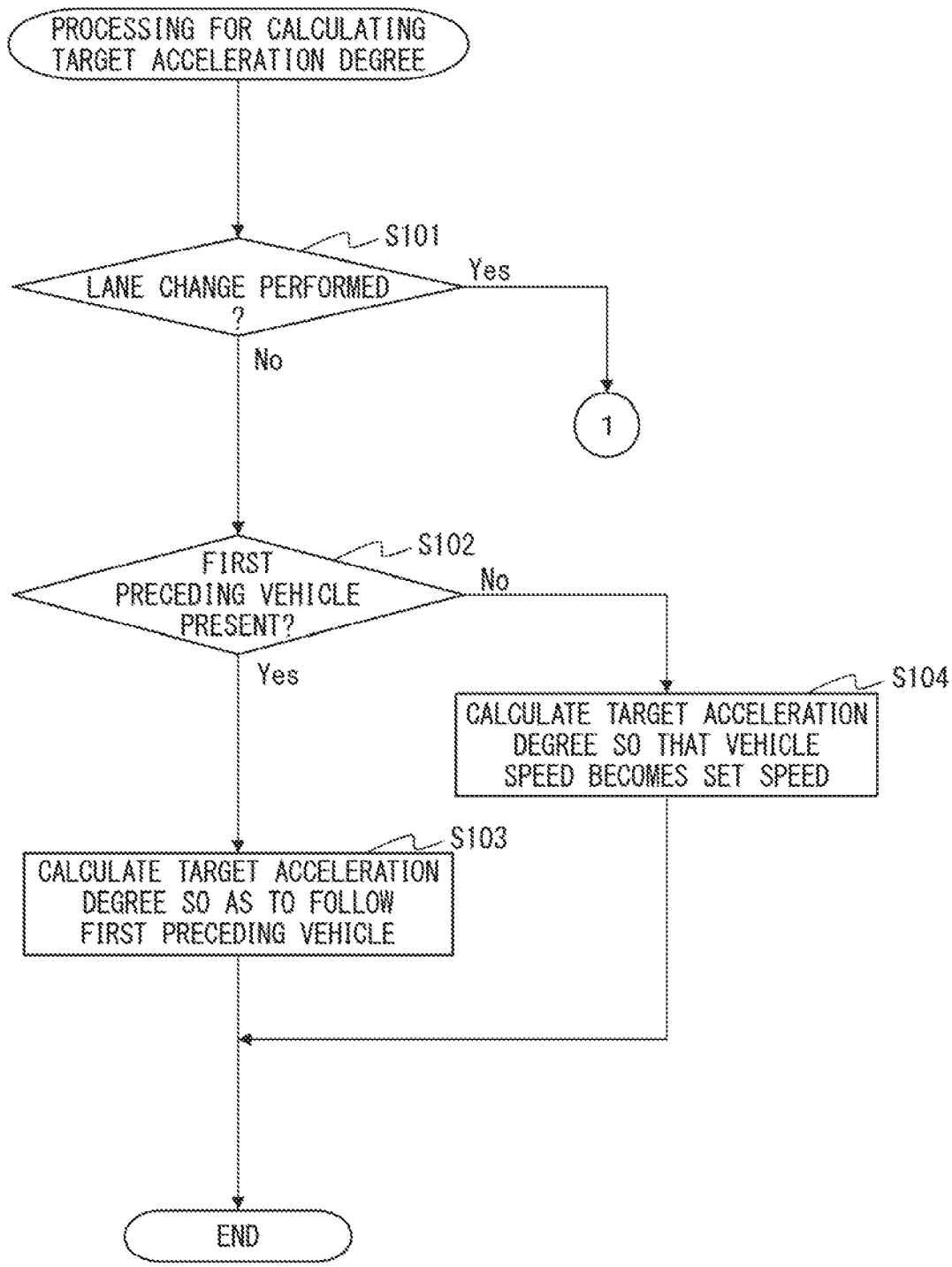

DRIVING ASSISTANCE DEVICE

FIELD

The present disclosure relates to a driving assistance device.

BACKGROUND

In recent years, a vehicle able to be automatically driven under predetermined conditions has been developed. When such a vehicle is being automatically driven, the acceleration, steering, and braking of the vehicle are automatically performed.

For example, when there is a surrounding vehicle running in front of the vehicle, the acceleration and deceleration of the vehicle are controlled so that the vehicle follows the surrounding vehicle. Further, if passing the surrounding vehicle is demanded by the driver or a system, the lane change by the automated driving is performed.

CITATION LIST

Patent Literature

[PTL 1] Japanese Unexamined Patent Publication No. 2019-18694
[PTL 2] Japanese Unexamined Patent Publication No. 2018-103833
[PTL 3] Japanese Unexamined Patent Publication No. 2017-202742

SUMMARY

Technical Problem

In this regard, in a lane change by manual driving, basically the acceleration and deceleration of the vehicle are controlled so that the vehicle follows a preceding vehicle in the destination lane. For this reason, in a lane change by automated driving, if the vehicle being followed is switched in the middle of the lane change from the preceding vehicle in the original lane to the preceding vehicle in the destination lane, it is difficult to realize natural acceleration like in manual driving (see PTL 1, paragraph 0013).

On the other hand, in the vehicle described in PTLs 1 or 2, in a lane change by automated driving, both of a preceding vehicle in the original lane and a preceding vehicle in the destination lane are followed and the acceleration and deceleration of the vehicle are controlled based on a lower value among the target acceleration degrees calculated for both of the preceding vehicles. However, if the target acceleration degree calculated for the preceding vehicle in the original lane being followed is selected, during the lane change, the acceleration and deceleration of the vehicle are controlled so that the vehicle follows the preceding vehicle in the original lane.

Further, in PTL 3, it is described that when a lane change is performed by automated driving, the target following distance with the preceding vehicle in the original lane is made shorter and the acceleration degree of the vehicle during the lane change is made larger. However, in this case as well, the preceding vehicle in the original lane is selected as an object to be followed during the lane change, and therefore it becomes difficult to realize natural acceleration like with manual driving.

In consideration of the above problems, an object of the present disclosure is to realize natural acceleration like with manual driving when a lane change is performed by automated driving.

Solution to Problem

The summary of the present disclosure is as follows.

(1) A driving assistance device comprising one or more processors configured to control operation of a host vehicle, wherein the one or more processors are configured to perform first following control controlling acceleration and deceleration of the host vehicle so that the host vehicle follows a first preceding vehicle running in front of the host vehicle in the same lane as the host vehicle, and perform second following control prohibiting the first following control while a lane change is being performed and controlling acceleration and deceleration of the host vehicle so that the host vehicle follows a second preceding vehicle running in front of the host vehicle in a destination lane, if the lane change of the host vehicle is started during the first following control.

(2) The driving assistance device described in above (1), wherein the one or more processors are configured to brake the host vehicle when a predetermined parameter determined based on a relative relationship between the host vehicle and the first preceding vehicle becomes equal to or less than a threshold value.

(3) The driving assistance device described in above (2), wherein the threshold value during the lane change is smaller than the threshold value before the lane change.

(4) The driving assistance device described in above (2) or (3), wherein the one or more processors are configured to: calculate a target acceleration degree of the host vehicle; calculate an upper limit value of the target acceleration degree; limit the target acceleration degree at the second following control to a value equal to or less than the upper limit value; and
control acceleration and deceleration of the host vehicle so that the acceleration degree of the host vehicle becomes the target acceleration degree.

(5) The driving assistance device described in above (4), wherein the one or more processors are configured to calculate an allowable limit value based on a following distance between the host vehicle and the first preceding vehicle and a relative speed of the host vehicle and the first preceding vehicle at the time of start of a lane change so that the host vehicle is not braked with respect to the first preceding vehicle during the lane change, and calculate the upper limit value as a value equal to or less than the allowable limit value.

(6) The driving assistance device described in above (5), wherein the one or more processors are configured to change a difference between the allowable limit value and the upper limit value based on a following distance between the host vehicle and the first preceding vehicle during the lane change.

(7) The driving assistance device described in above (5) or (6), wherein the one or more processors are configured to change a difference between the allowable limit value and the upper limit value based on a lateral position of the host vehicle during the lane change.

(8) The driving assistance device described in any one of above (1) to (7), wherein the one or more processors are configured to: calculate a target acceleration degree of the host vehicle; control acceleration and deceleration of the host vehicle so that the acceleration degree of the host vehicle becomes the target acceleration degree; and calculate the target acceleration degree so that a following distance between the host vehicle and the second preceding vehicle becomes a target following distance in the second following control, and if the following distance between the host vehicle and the second preceding vehicle at the time of start of the lane change is less than a predetermined set following distance, gradually increase the target following distance at the second following control from the following distance between the host vehicle and the second preceding vehicle at the time of start of the lane change to the set following distance.

According to the present disclosure, it is possible to realize natural acceleration like with manual driving when a lane change is performed by automated driving.

BRIEF DESCRIPTION OF DRAWINGS

FIG. 5A is a flow chart showing a control routine of processing for calculating a target acceleration degree in the first embodiment.

DESCRIPTION OF EMBODIMENTS

Figure 1:
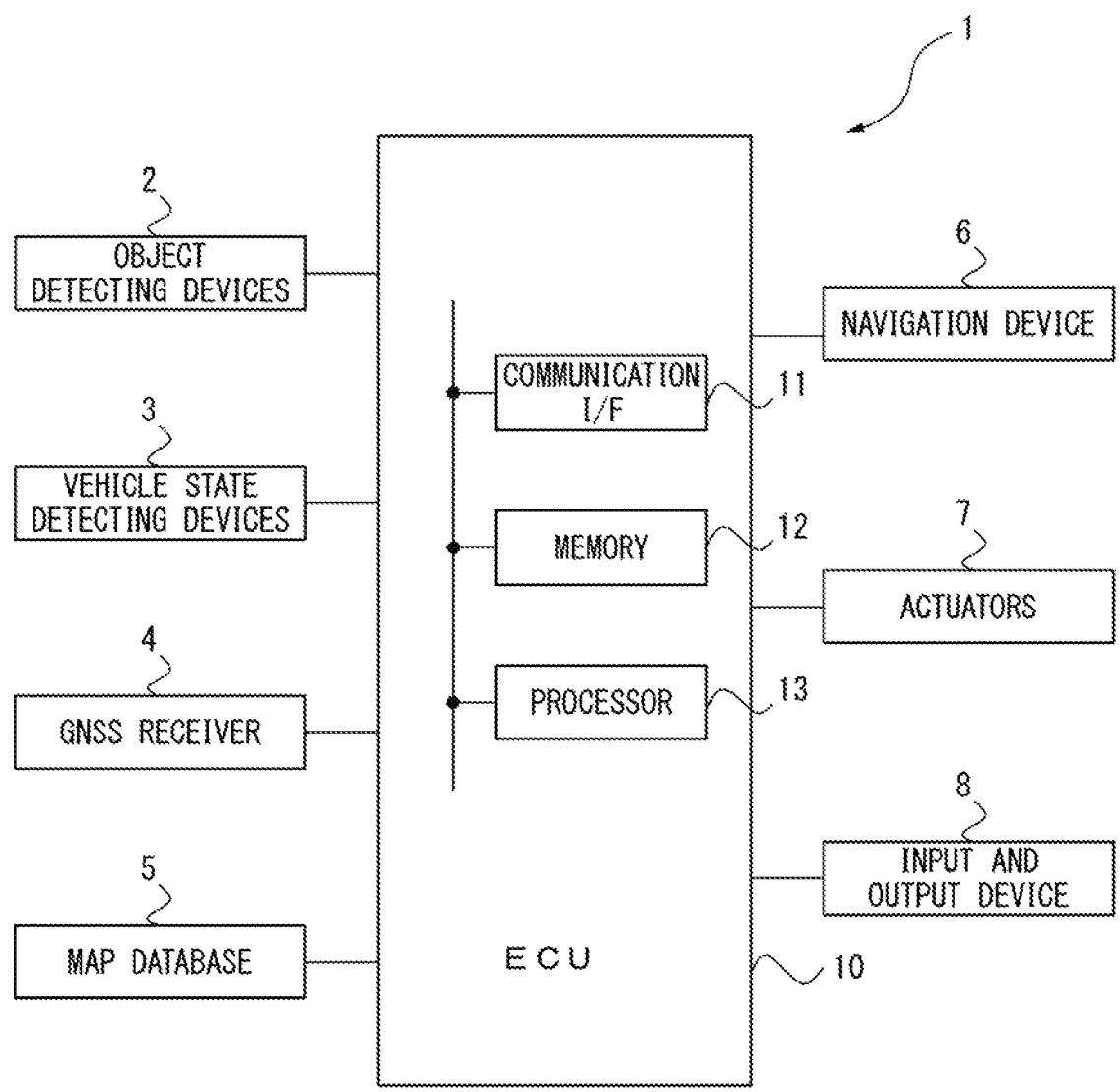
FIG. 1 is a view schematically showing a part of the configuration of a vehicle in which a driving assistance device according to a first embodiment of the present disclosure is provided.

Below, embodiments of the present disclosure will be explained in detail while referring to the drawings. Note that, in the following explanation, similar component elements will be assigned the same reference notations.

First Embodiment

First, referring to FIG. 1 to FIG. 8, a first embodiment of the present disclosure will be explained.

<Explanation of Vehicle as Whole>

FIG. 1 is a view schematically showing a part of the configuration of a vehicle 1 in which a driver assistance device according to the first embodiment of the present disclosure is provided. The vehicle 1 can perform an automated driving in which a part or all of the acceleration, steering, and braking of the vehicle 1 are controlled automatically. Note that the automated driving is also called "self driving".

As shown in FIG. 1, the vehicle 1 is provided with an object detection device 2, a vehicle status detection device 3, a GNSS receiver 4, a map database 5, a navigation device 6, actuators 7, an input/output device 8, and an electronic control unit (ECU) 10. The object detection device 2, the vehicle status detection device 3, the GNSS receiver 4, the map database 5, the navigation device 6, the actuators 7, and the input/output device 8 are connected through an internal vehicle network based on the CAN (Controller Area Network) or other standard to be able to communicate with the ECU 10.

The object detection device 2 detects objects (surrounding vehicles, road signs, white lines, fallen objects, etc.) present in the surroundings of the vehicle 1 (host vehicle). Specifically, the object detection device 2 detects whether or not there is any object in the surroundings of the vehicle 1, a distance from the vehicle 1 to the object, and a relative speed between the vehicle 1 and the object. The object detection device 2 includes, for example, a camera, a LIDAR (laser imaging detection and ranging), a milliwave radar, an ultrasonic sensor (sonar), etc. The output of the object detection device 2 is sent to the ECU 10.

Figure 2:
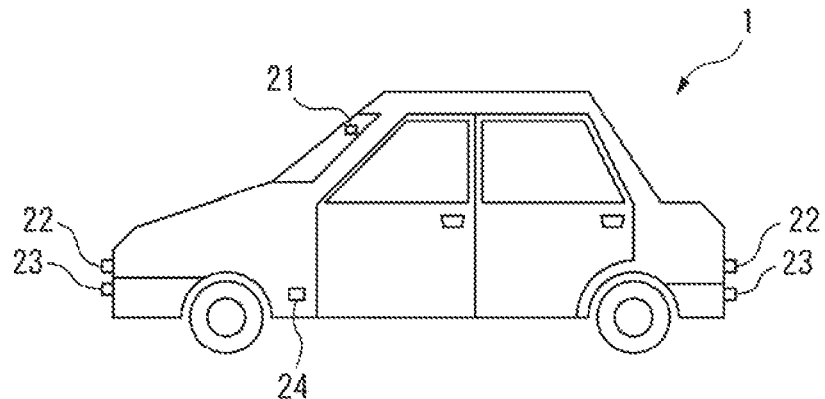
FIG. 2 is a view showing one example of an object detection device provided at a vehicle.

FIG. 2 is a view showing one example of the object detection device 2 provided at the vehicle 1. In the example of FIG. 2, the vehicle 1 is provided with, as the object detection device 2, an external camera 21, a LIDAR 22, a milliwave radar 23, and an ultrasonic sensor (sonar) 24.

The external camera 21 captures the surroundings of the vehicle 1 to generate an image of the surroundings of the vehicle 1. For example, the external camera 21 is placed at the front of the vehicle 1 (for example, the back surface of the room mirror inside the passenger compartment, the front bumper, etc.) so as to capture the area in front of the vehicle 1. Note that, the external camera 21 may be a stereo camera able to measure distance.

The LIDAR 22 emits laser light at the surroundings of the vehicle 1 and receives the reflections of the laser light. Due to this, the LIDAR 22 can detect whether or not there is any object in the surroundings of the vehicle 1, the distance from the vehicle 1 to the object, and the relative speed of the vehicle 1 and the object. For example, the LIDAR 22 is arranged at the front part and back part of the vehicle 1 (for example, the front bumper and the rear bumper of the vehicle 1).

The milliwave radar 23 emits milliwaves to the surroundings of the vehicle 1 and receives the reflections of the milliwaves. By doing this, the milliwave radar 23 can detect whether or not there is any object in the surroundings of the vehicle 1, the distance from the vehicle 1 to the object, and the relative speed of the vehicle 1 and the object. For example, the milliwave radar 23 is arranged at the front part and back part of the vehicle 1 (for example, the front bumper and the rear bumper of the vehicle 1).

The ultrasonic sensor 24 emits ultrasonic waves to the surroundings of the vehicle 1 and receives reflections of the ultrasonic waves. Due to this, the ultrasonic sensor 24 can detect whether or not there is any object in the surroundings of the vehicle 1, the distance from the vehicle 1 to the object, and the relative speed of the vehicle 1 and the object. For example, the ultrasonic sensor 24 is arranged at the both side parts of the vehicle 1 (for example, the left and right front fenders of the vehicle 1).

Note that, the arrangements and numbers of the external camera 21, the LIDAR 22, the milliwave radar 23, and the ultrasonic sensor 24 are not limited to the above. Further, some of these may be omitted.

The vehicle state detection devices 3 detect the status quantities of the vehicle 1. The status quantities of the vehicle 1 include a speed of the vehicle 1 (vehicle speed), an acceleration degree, a steering angle, a yaw rate, etc. The vehicle state detection devices 3 include, for example, a vehicle speed sensor, an acceleration degree sensor, a steering angle sensor, a yaw rate sensor, etc. The outputs of the vehicle state detection device 3 are sent to the ECU 10.

The GNSS receiver 4 captures a plurality of satellites and receives signals sent from the satellites. The GNSS receiver 4 calculates the distances to the satellites based on the differences from the times of transmission and times of reception of the signals and detects the current position of the vehicle 1 (for example, the latitude and longitude of the vehicle 1) based on the distances to the satellites and positions of the satellites (orbit information). The output of the GNSS receiver 4 is transmitted to the ECU 10. Note that, "GNSS" (global navigation satellite system) is the general term for the GPS of the U.S., GLONASS of Russia, Galileo of Europe, QZSS of Japan, BeiDou of China, IRNSS of India, and other satellite position measurement systems. Therefore, the GNSS receiver 4 includes a GPS receiver.

The map database 5 stores map information. The map information stored in the map database 5 may be periodically updated using communication of the vehicle 1 with the outside, SLAM (simultaneous localization and mapping) technology, etc. The ECU 10 acquires the map information from the map database 5.

The navigation device 6 sets the driving route of the vehicle 1 to the destination based on the current position of the vehicle 1 detected by the GNSS receiver 4, the map information of the map database 5, input by the driver, etc. The driving route set by the navigation device 6 is transmitted to the ECU 10. Note that, the GNSS receiver 4 and the map database 5 may be incorporated into the navigation device 6.

The actuators 7 make the vehicle 1 operate. For example, the actuators 7 include a drive device for acceleration of the vehicle 1 (at least one of an engine and a motor), a brake actuator for braking of the vehicle 1, a steering motor for steering the vehicle 1, etc. The ECU 10 controls the actuators 7 for performing automated driving of the vehicle 1.

The input/output device 8 inputs and outputs information between the driver and the vehicle 1. The input/output device 8, for example, has a display for displaying information, a speaker for generating sound, an operating button or an operating switch for the driver to operate to input commands, a microphone for receiving voice commands, etc. The output of the ECU 10 is transmitted through the input/output device 8 to the driver, while the input from the driver is transmitted through the input/output device 8 to the ECU 10. The input/output device is also called a Human Machine Interface (HMI).

The ECU 10 performs various types of control of the vehicle. As shown in FIG. 1, the ECU 10 is provided with a communication interface 11, a memory 12, and a processor 13. The communication interface 11 and the memory 12 are connected to the processor 13 through signal lines. Note that, in the present embodiment, a single ECU 10 is provided, but a plurality of ECUs may be provided for the respective functions.

The communication interface 11 has an interface circuit for connecting the ECU 10 to the internal vehicle network. The ECU 10 communicates through the communication interface 11 with the object detection device 2, the vehicle status detection device 3, the GNSS receiver 4, the map database 5, the navigation device 6, the actuators 7, and the input/output device 8.

The memory 12, for example, has a volatile semiconductor memory and a nonvolatile semiconductor memory. The memory 12 stores programs, data, etc. used when various processing are performed by the processor 13.

The processor 13 has one or more CPUs (central processing unit) and their peripheral circuits. Note that, the processor 13 may have a processing circuit such as a logic unit or an arithmetic unit.

<Driving Assistance Device>

Figure 3:
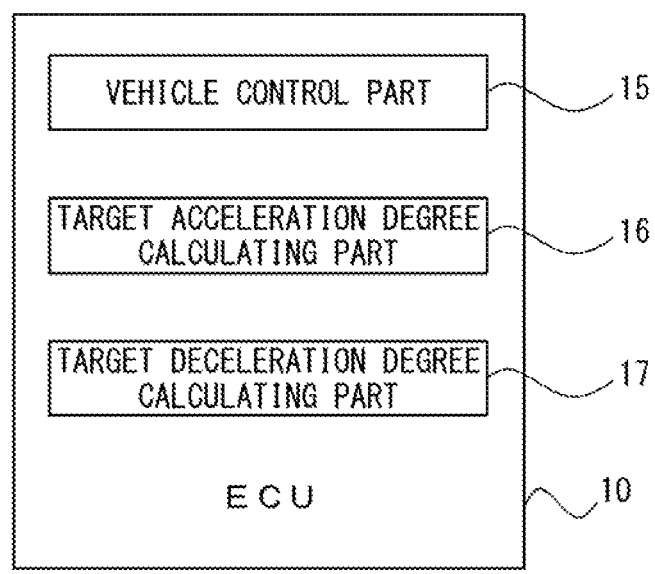
FIG. 3 is a functional block diagram of an ECU in the first embodiment.

In the present embodiment, the ECU 10 functions as a driving assistance device for assisting driving of the vehicle 1. FIG. 3 is a functional block diagram of the ECU 10 in the first embodiment. In the present embodiment, the ECU 10 has a vehicle control part 15, a target acceleration degree calculating part 16 and a target deceleration degree calculating part 17. The vehicle control part 15, the target acceleration degree calculating part 16 and the target deceleration degree calculating part 17 are functional modules realized by programs stored in the memory 12 of the ECU 10 being run by the processor 13 of the ECU 10.

The vehicle control part 15 controls the operation of the vehicle 1. In the present embodiment, if the driver selects the automated driving mode as the driving mode of the vehicle 1, automated driving of the vehicle 1 is performed under predetermined conditions. The vehicle control part 15 performs acceleration, steering, and braking of the vehicle 1 when automated driving of the vehicle 1 is performed. Specifically, the vehicle control part 15 uses actuators 7 to perform acceleration, steering, and braking of the vehicle 1 so that the vehicle 1 safely runs along a predetermined running route.

The target acceleration degree calculating part 16 calculates the target acceleration degree of the vehicle 1, and the vehicle control part 15 controls the acceleration and deceleration of the vehicle 1 so that the acceleration degree of the vehicle 1 becomes the target acceleration degree. The target deceleration degree calculating part 17 calculates the target deceleration degree of the vehicle 1, and the vehicle control part 15 brakes the vehicle 1 in accordance with need so that the deceleration degree of the vehicle 1 becomes the target deceleration degree.

Figure 4:
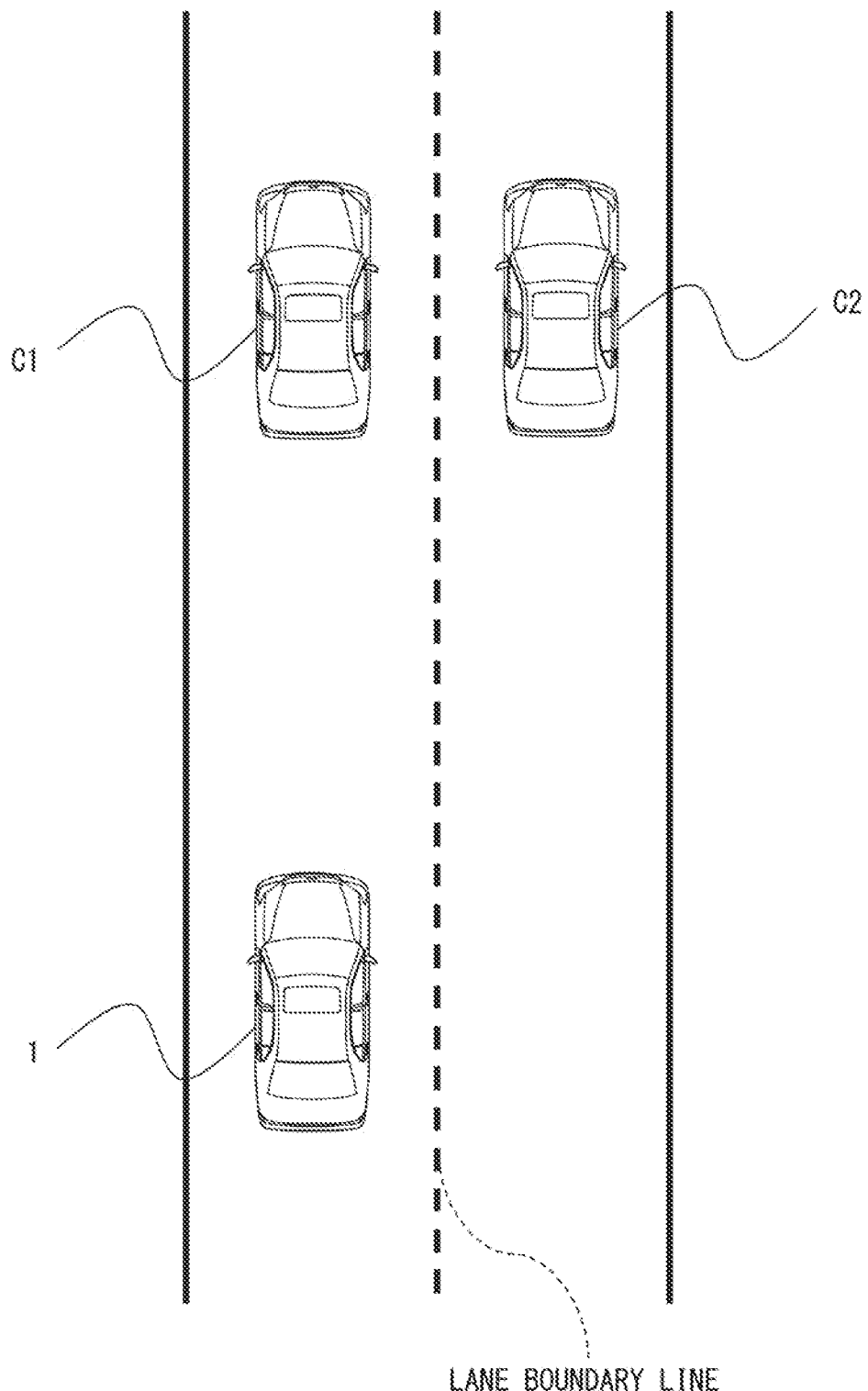
FIG. 4 is a view showing a situation in which a lane change of a vehicle is performed for passing a surrounding vehicle.

FIG. 4 is a view showing the situation where a lane change of the vehicle 1 is performed for passing a surrounding vehicle. As shown in FIG. 4, if there is a first preceding vehicle C1 running in front of the vehicle in the same lane as the vehicle 1, the vehicle control part 15 performs first following control controlling acceleration and deceleration of the vehicle 1 so that the vehicle 1 follows the first preceding vehicle C1. In the first following control, the target acceleration degree calculating part 16 calculates the target acceleration degree of the vehicle 1 based on the following distance between the vehicle 1 and the first preceding vehicle C1 so that the vehicle 1 follows the first preceding vehicle C1.

On the other hand, if there is no first preceding vehicle C1, the vehicle control part 15 performs constant speed control controlling acceleration and deceleration of the vehicle 1 so that the speed of the vehicle 1 becomes a set speed. In the constant speed control, the target acceleration degree calculating part 16 calculates the target acceleration degree of the vehicle 1 based on the speed of the vehicle 1 so that the speed of the vehicle 1 becomes a set speed. The first following control is also called adaptive cruise control (ACC) along with constant speed control.

Further, if a lane change of the vehicle 1 is demanded by the driver or a system, the vehicle control part 15 performs a lane change by automated driving. For example, if a lane change for passing the first preceding vehicle C1 is demanded by the driver or the system, the vehicle control part 15 controls steering of the vehicle 1 so that the vehicle 1 moves to the destination lane (in this case, the passing lane).

When a lane change is performed, not only steering of the vehicle 1, but also acceleration and deceleration of the vehicle 1 have to be controlled. As shown in FIG. 4, when a lane change is performed for passing the first preceding vehicle C1, sometimes there is a second preceding vehicle C2 running in front of the vehicle 1 at the destination lane. If a lane change is performed by manual driving in such a situation, usually the driver controls acceleration and deceleration of the vehicle 1 by targeting the second preceding vehicle C2 instead of the first preceding vehicle C1.

For this reason, in the present embodiment, if a lane change of the vehicle 1 is started during the first following control, the vehicle control part 15 performs second following control prohibiting the first following control while the lane change is performed and controlling acceleration and deceleration of the vehicle 1 so that the vehicle 1 follows the second preceding vehicle C2. By doing this, natural acceleration like manual driving can be realized when a lane change by automated driving is performed.

In the second following control, the target acceleration degree calculating part 16 calculates the target acceleration degree of the vehicle 1 based on the following distance between the vehicle 1 and the second preceding vehicle C2 so that the vehicle 1 follows the second preceding vehicle C2. Further, when the first following control is prohibited during the lane change, the target acceleration degree calculating part 16 stops the processing of the target acceleration degree for following the first preceding vehicle C1. By doing this, it is possible to avoid an increase in the processing load due to following both the first preceding vehicle C1 and the second preceding vehicle C2.

On the other hand, if there is no second preceding vehicle C2 present at the time of a lane change, the vehicle control part 15 performs constant speed control controlling the acceleration and deceleration of the vehicle 1 so that the speed of the vehicle 1 becomes a set speed. As explained above, in constant speed control, the target acceleration degree calculating part 16 calculates the target acceleration degree of the vehicle 1 based on the speed of the vehicle 1 so that the speed of the vehicle 1 becomes a set speed.

However, as explained above, even if acceleration and deceleration of the vehicle 1 are controlled, situations can arise in which braking of the vehicle 1 is made necessary due to deceleration of the preceding vehicle or other reason. For this reason, the vehicle control part 15 brakes the vehicle 1 when a predetermined parameter determined based on the relative relationship between the vehicle 1 and the preceding vehicle (the first preceding vehicle C1 or the second preceding vehicle C2) becomes equal to or less than a threshold value.

In the present embodiment, the vehicle control part 15 brakes the vehicle 1 when a first target deceleration degree required for making the relative speed between the vehicle 1 and the first preceding vehicle C1 at a predetermined minimum following distance zero becomes equal to or less than the threshold value. Further, the vehicle control part 15 brakes the vehicle 1 when a second target deceleration degree required for making the relative speed between the vehicle 1 and the second preceding vehicle C2 at a predetermined minimum following distance zero becomes equal to or less than the threshold value.

The first target deceleration degree and the second target deceleration degree are calculated as negative values by the target deceleration degree calculating part 17. Note that, the processing of the first target deceleration degree and the second target deceleration degree by the target deceleration degree calculating part 17 is performed for avoiding collision with a preceding vehicle. This is clearly differentiated from processing of the target acceleration degree performed for following a preceding vehicle.

<Processing for Calculating Target Acceleration Degree>

Figure 5B:
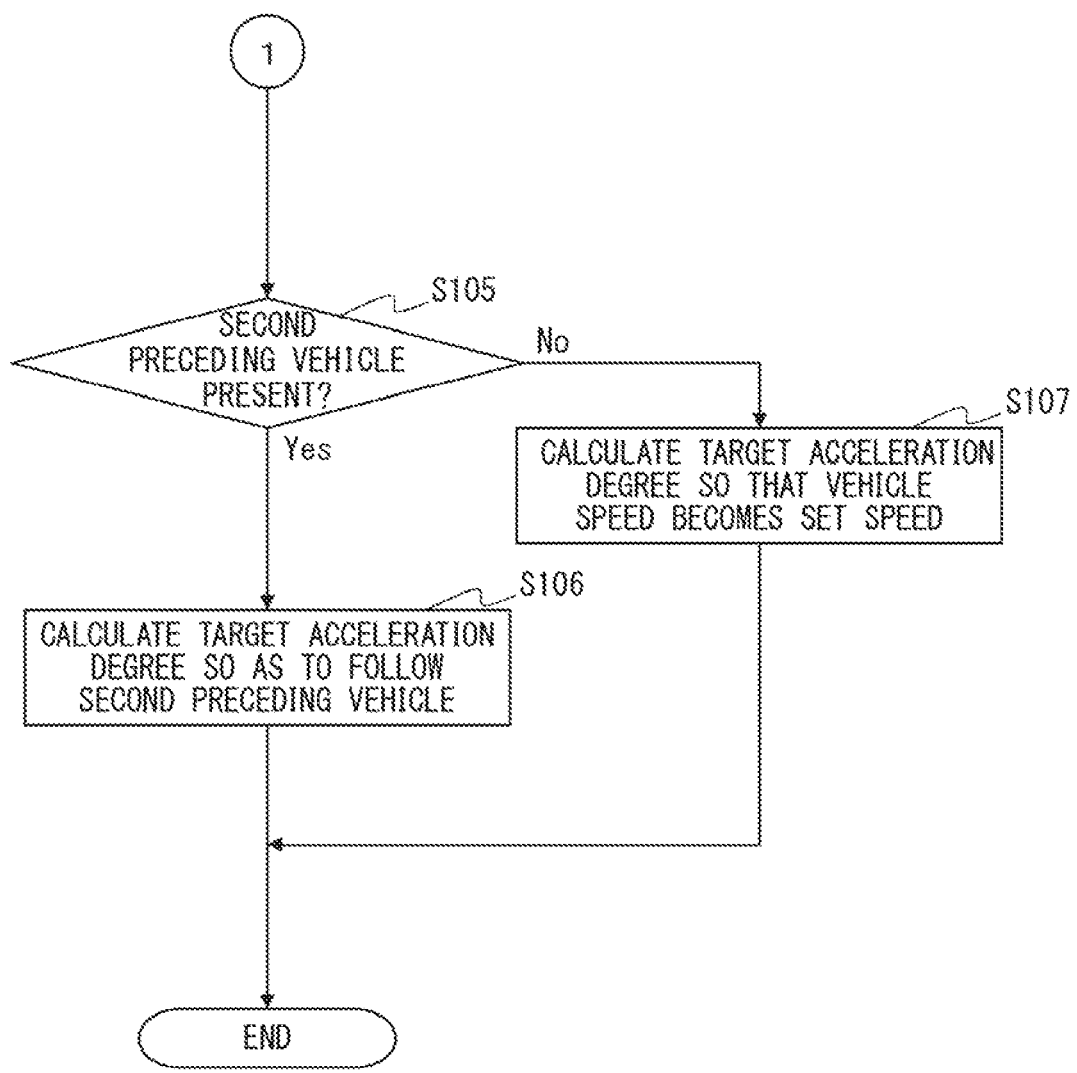
FIG. 5B is a flow chart showing a control routine of processing for calculating a target acceleration degree in the first embodiment.

Below, referring to the flow charts of FIG. 5A to FIG. 8, the above-mentioned control of acceleration and deceleration of the vehicle 1 will be explained in detail. FIG. 5A and FIG. 5B are flow charts showing a control routine of processing for calculating a target acceleration degree in the first embodiment. The present control routine is repeatedly performed at predetermined intervals by the ECU 10 while the vehicle 1 is being automatically driven.

First, at step S101, the target acceleration degree calculating part 16 judges whether a lane change of the vehicle 1 is being performed. The timing of start of the lane change is defined as, for example, when the driver authorizes a lane change through the input/output device 8, when a turn signal of the vehicle 1 is operated for a lane change, when the start of a lane change is notified to the driver through the input/output device 8, or when a steering operation for a lane change is started by the vehicle control part 15. On the other hand, the timing of end of the lane change is defined as when the front end part of the vehicle 1 reaches the lane boundary line, when the vehicle 1 as a whole enters the destination lane, when the steering operation for the lane change by the vehicle control part 15 ends, or when the turn signal of the vehicle 1 is stopped.

If at step S101 it is judged that a lane change of the vehicle 1 is not being performed, the present control routine proceeds to step S102. At step S102, the target acceleration degree calculating part 16 judges whether there is a first preceding vehicle running in front of the vehicle 1 in the same lane as the vehicle 1 based on the output of the object detection device 2. For example, the first preceding vehicle is selected as a surrounding vehicle closest to the vehicle 1 among surrounding vehicles running in the same lane as the vehicle 1 in a predetermined range in front of the vehicle 1.

If at step S102 it is judged that there is a first preceding vehicle, the present control routine proceeds to step S103. At step S103, the target acceleration degree calculating part 16 calculates the target acceleration degree of the vehicle 1 based on the following distance between the vehicle 1 and the first preceding vehicle so that the vehicle 1 follows the first preceding vehicle. For example, the target acceleration degree calculating part 16 calculates the target acceleration degree TA of the vehicle 1 by the following formula (1) based on the following distance $d_1$ between the vehicle 1 and the first preceding vehicle, the target following distance $d_{ta}$, and the relative speed $V_{r1}$ of the vehicle 1 and the first preceding vehicle (speed of vehicle 1−speed of first preceding vehicle):

$$TA=(d_1-d_{ta})\cdot K1-V_{r1}\cdot K2 \qquad (1)$$

Here, K1 and K2 are respectively predetermined positive coefficients. The following distance $d_1$ and the relative speed $V_{r1}$ are respectively calculated based on the output of the object detection device 2. The target following distance $d_{ta}$ is, for example, set to a predetermined set following distance.

The set following distance is determined in advance by the driver through the input/output device 8. For example, the driver selects his or her preference of the following distance from a plurality of set modes (for example, a short mode, a medium mode, and a long mode). The set following distance is determined in accordance with the speed of the vehicle 1 based on the selected set mode. Note that, the set following distance may be automatically determined in accordance with the speed of the vehicle 1 etc. Further, the set following distance may be a predetermined fixed value.

As will be understood from the above formula (1), the target acceleration degree calculating part 16 calculates the target acceleration degree TA so that the following distance $d_1$ becomes the target following distance $d_{ta}$ and the relative speed $V_{r1}$ becomes zero. Note that, the following distance $d_1$ may be expressed as the time until the vehicle 1 reaches the current position of the first preceding vehicle (time headway (THW)), that is, the value of the following distance between the vehicle 1 and the first preceding vehicle divided by the speed of the vehicle 1. In this case, the target following distance $d_{ta}$ is also determined as the time. Further, the second term at the right side of the above formula (1) may be omitted. After step S103, the present control routine ends.

On the other hand, if at step S102 it is judged that there is no first preceding vehicle, the present control routine proceeds to step S104. At step S104, the target acceleration degree calculating part 16 calculates the target acceleration degree of the vehicle 1 based on the speed of the vehicle 1 so that the speed of the vehicle 1 becomes the set speed. For example, the target acceleration degree calculating part 16 calculates the target acceleration degree TA of the vehicle 1 by the following formula (2) based on the speed V of the vehicle 1 and the set speed $V_{set}$:

$$TA=(V_{set}-V)\cdot K3 \qquad (2)$$

where, K3 is a predetermined positive coefficient.

The speed of the vehicle 1 is detected by a vehicle state detection device 3 (specifically the vehicle speed sensor), and the set speed $V_{set}$ is determined in advance by the driver through the input/output device 8. Note that, the set speed $V_{set}$ may be automatically determined based on the maximum legal speed of the road on which the vehicle 1 is running. When the speed V of the vehicle 1 is lower than the set speed $V_{set}$, a positive value is calculated as the target acceleration degree TA, while when the speed V of the vehicle 1 is higher than the set speed $V_{set}$, a negative value is calculated as the target acceleration degree TA. After step S104, the present control routine ends.

On the other hand, if at step S101 it is judged that a lane change of the vehicle 1 is being performed, the present control routine proceeds to step S105. At step S105, the target acceleration degree calculating part 16 judges whether there is a second preceding vehicle running in front of the vehicle 1 in the destination lane based on the output of the object detection device 2. For example, the second preceding vehicle is selected as a surrounding vehicle closest to the vehicle 1 among surrounding vehicles running in the destination lane in a predetermined range in front of the vehicle 1.

If at step S105 it is judged that there is a second preceding vehicle, the present control routine proceeds to step S106. At step S106, the target acceleration degree calculating part 16 calculates the target acceleration degree of the vehicle 1 based on the following distance between the vehicle 1 and the second preceding vehicle so that the vehicle 1 follows the second preceding vehicle. For example, the target acceleration degree calculating part 16 calculates the target acceleration degree TA of the vehicle 1 by the following formula (3) similar to the above formula (1) based on the following distance $d_2$ between the vehicle 1 and the second preceding vehicle, the target following distance $d_{ta}$, and the relative speed $V_{r2}$ between the vehicle 1 and the second preceding vehicle (speed of vehicle 1−speed of second preceding vehicle):

$$TA=(d_2-d_{ta})\cdot K1-V_{r2}\cdot K2 \qquad (3)$$

The following distance $d_2$ and the relative speed $V_{r2}$ are respectively calculated based on the output of the object detection device 2. As will be understood from the above formula (3), the target acceleration degree calculating part 16 calculates the target acceleration degree TA so that the following distance $d_2$ becomes the target following distance $d_{ta}$ and the relative speed $V_{r2}$ becomes zero. Note that, the following distance $d_2$ may be expressed as the time until the vehicle 1 reaches the current position of the second preceding vehicle (time headway (THW)), that is, the value of the following distance between the vehicle 1 and the second preceding vehicle divided by the speed of the vehicle 1. In this case, the target following distance $d_{ta}$ is also determined as the time. Further, the second term at the right side of the above formula (3) may be omitted. After step S106, the present control routine ends.

On the other hand, if at step S105 it is judged that there is no second preceding vehicle, the present control routine proceeds to step S107. At step S107, the target acceleration degree calculating part 16, in the same way as step S104, calculates the target acceleration degree of the vehicle 1 based on the speed of the vehicle 1 so that the speed of the vehicle 1 becomes a set speed. After step S107, the present control routine ends.

<Processing for Calculating First Target Deceleration Degree>

Figure 6:
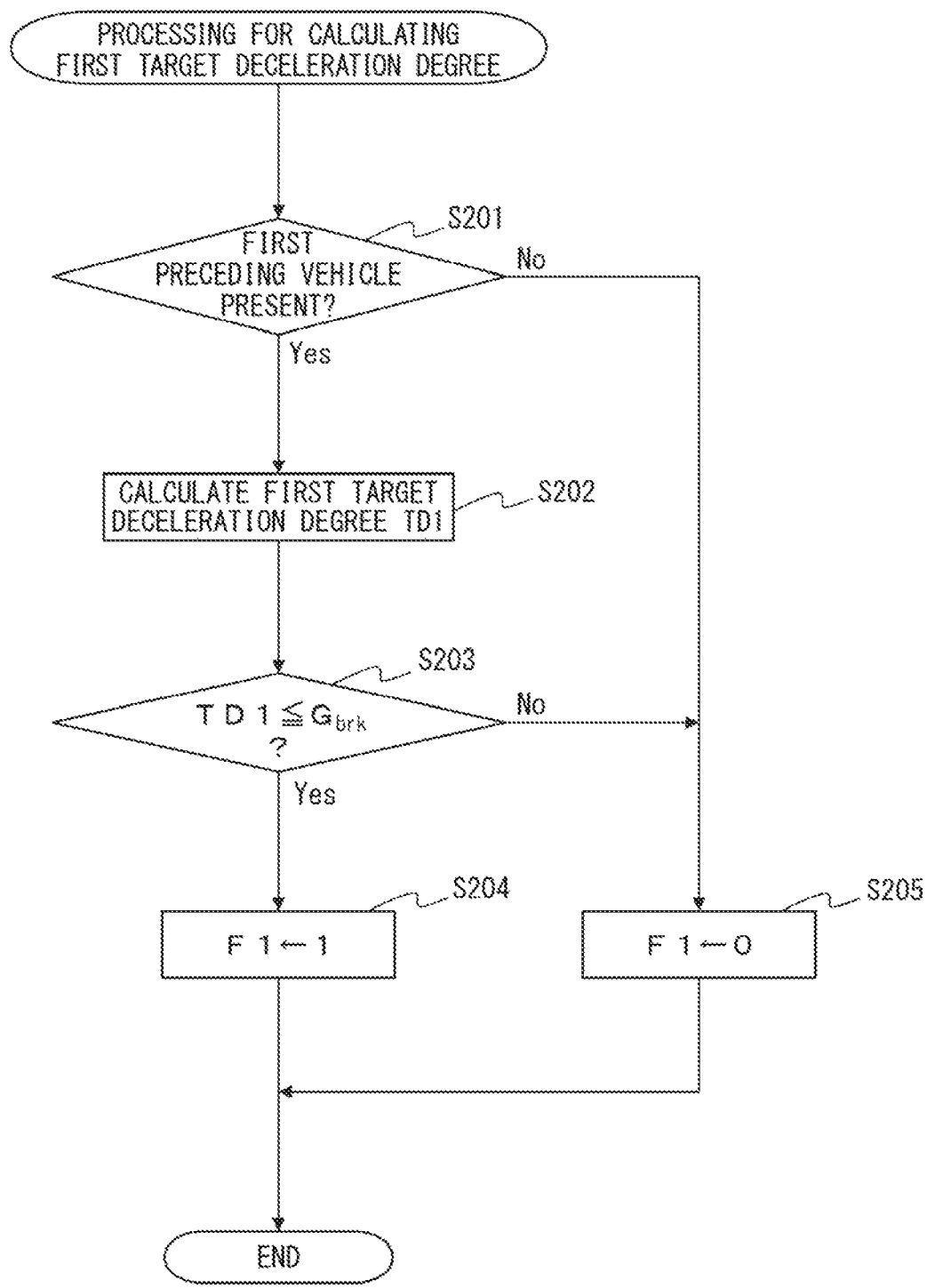
FIG. 6 is a flow chart showing a control routine of processing for calculating a first target deceleration degree in the first embodiment.

FIG. 6 is a flow chart showing a control routine of processing for calculating a first target deceleration degree in the first embodiment. The present control routine is repeatedly performed at predetermined intervals by the ECU 10 while the vehicle 1 is being automatically driven.

First, at step S201, the target deceleration degree calculating part 17, in the same way as step S101 of FIG. 5A, judges whether there is a first preceding vehicle based on the output of the object detection device 2. If at step S201 it is judged that there is a first preceding vehicle, the present control routine proceeds to step S202.

At step S202, the target deceleration degree calculating part 17 calculates the first target deceleration degree required for making the relative speed of the vehicle 1 and the first preceding vehicle zero at a predetermined minimum following distance. For example, the target deceleration degree calculating part 17 calculates the first target deceleration degree TD1 by the following formula (4) based on the relative speed $V_{r1}$ of the vehicle 1 and the first preceding vehicle and the following distance $d_1$ between the vehicle 1 and the first preceding vehicle.

$$TD1 = -(V_{r1})^2 / \{\alpha \cdot (d_1 - d_{low})\} \qquad (4)$$

Here, α is a predetermined coefficient (for example, 1 to 2) determined in accordance with the mode of deceleration of the vehicle 1. If the vehicle 1 is braked at a constant deceleration degree, it is set to 2. $d_{low}$ is a predetermined minimum following distance, for example, is 3 m to 5 m. The first target deceleration degree TD1 is calculated as a negative value. The larger the absolute value of the same, the more rapidly the vehicle 1 is decelerated.

Next, at step S203, the target deceleration degree calculating part 17 judges whether the first target deceleration degree TD1 is equal to or less than a threshold value $G_{brk}$. The threshold value $G_{brk}$ is determined in advance as a negative value considering the braking performance of the vehicle 1 etc.

If at step S203 it is judged that the first target deceleration degree TD1 is equal to or less than the threshold value $G_{brk}$, the present control routine proceeds to step S204. At step S204, the target deceleration degree calculating part 17 sets a first braking flag F1 to "1". That is, the first braking flag F1 is set to "1" when braking of the vehicle 1 with respect to the first preceding vehicle is required. After step S204, the present control routine ends.

On the other hand, if at step S201 it is judged that there is no first preceding vehicle or at step S203 it is judged that the first target deceleration degree TD1 is larger than the threshold value $G_{brk}$, the present control routine proceeds to step S205. In this case, braking of the vehicle 1 with respect to the first preceding vehicle is not necessary, and therefore at step S205, the target deceleration degree calculating part 17 sets the first braking flag F1 to zero. After step S205, the present control routine ends.

Note that, at step S203, the target deceleration degree calculating part 17 may judge whether the following distance between the vehicle 1 and the first preceding vehicle is equal to or less than the threshold value $G_{brk}$. That is, the predetermined parameter determined based on the relative relationship between the vehicle 1 and the first preceding vehicle may be the following distance between the vehicle 1 and the first preceding vehicle.

<Processing for Calculating Second Target Deceleration Degree>

Figure 7:
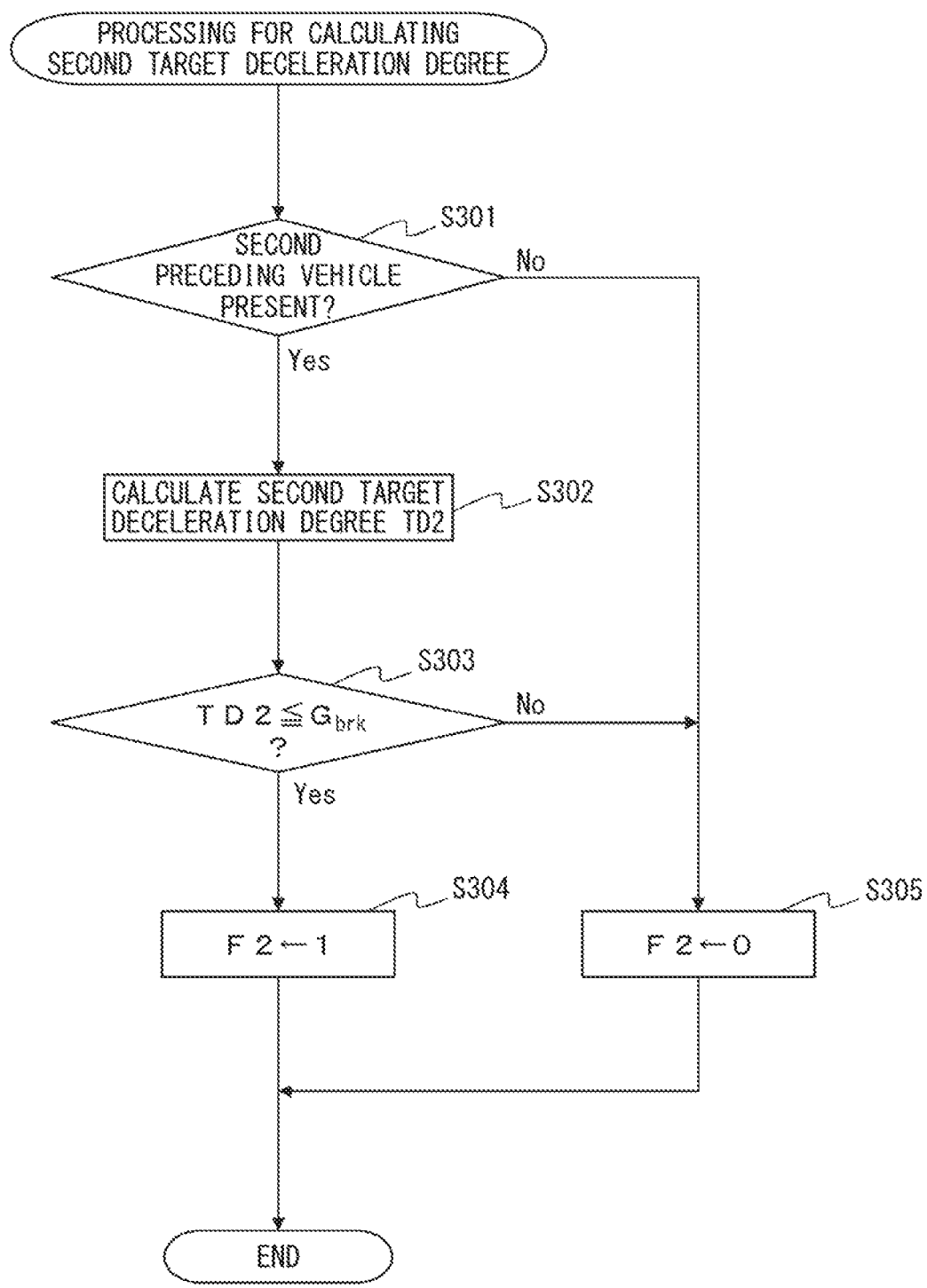
FIG. 7 is a flow chart showing a control routine of processing for calculating a second target deceleration degree in the first embodiment.

FIG. 7 is a flow chart showing a control routine of processing for calculating a second target deceleration degree in the first embodiment. The present control routine is repeatedly performed at predetermined intervals by the ECU 10 while the vehicle 1 is being automatically driven.

First, at step S301, the target deceleration degree calculating part 17, in the same way as step S105 of FIG. 5B, judges whether there is a second preceding vehicle based on the output of the object detection device 2. If at step S301 it is judged that there is a second preceding vehicle, the present control routine proceeds to step S302.

At step S302, the target deceleration degree calculating part 17 calculates the second target deceleration degree required for making the relative speed of the vehicle 1 and the second preceding vehicle zero at a predetermined minimum following distance. For example, the target deceleration degree calculating part 17 calculates the second target deceleration degree TD2 by the following formula (5) similar to the above formula (4) based on the relative speed $V_{r2}$ of the vehicle 1 and the second preceding vehicle and the following distance $d_2$ between the vehicle 1 and the second preceding vehicle:

$$TD2 = -(V_{r2})^2 / \{\alpha \cdot (d_2 - d_{low})\} \qquad (5)$$

The second target deceleration degree TD2 is calculated as a negative value. The larger the absolute value of the same, the more rapidly the vehicle 1 is decelerated.

Next, at step S303, the target deceleration degree calculating part 17 judges whether the second target deceleration degree TD2 is equal to or less than the threshold value $G_{brk}$. The threshold value $G_{brk}$ is determined in advance as a negative value considering the braking performance etc., of the vehicle 1.

If at step S303 it is judged that the second target deceleration degree TD2 is equal to or less than the threshold value $G_{brk}$, the present control routine proceeds to step S304. At step S304, the target deceleration degree calculating part 17 sets the second braking flag F2 to "1". That is, the second braking flag F2 is set to "1" when the vehicle 1 has to be braked with respect to the second preceding vehicle. After step S304, the present control routine ends.

On the other hand, if at step S301 it is judged that there is no second preceding vehicle or if at step S303 it is judged that the second target deceleration degree TD2 is larger than the threshold value $G_{brk}$, the present control routine proceeds to step S305. In this case, braking of the vehicle 1 with respect to the second preceding vehicle is not necessary, and therefore at step S305, the target deceleration degree calculating part 17 sets a second braking flag F2 to zero. After step S305, the present control routine ends.

Note that, at step S303, the target deceleration degree calculating part 17 may judge whether the following distance between the vehicle 1 and the second preceding vehicle is equal to or less than the threshold value $G_{brk}$. That is, the predetermined parameter determined based on the relative relationship of the vehicle 1 and the second preceding vehicle may be the following distance between the vehicle 1 and the second preceding vehicle.

<Control of Acceleration and Deceleration>

Figure 8:
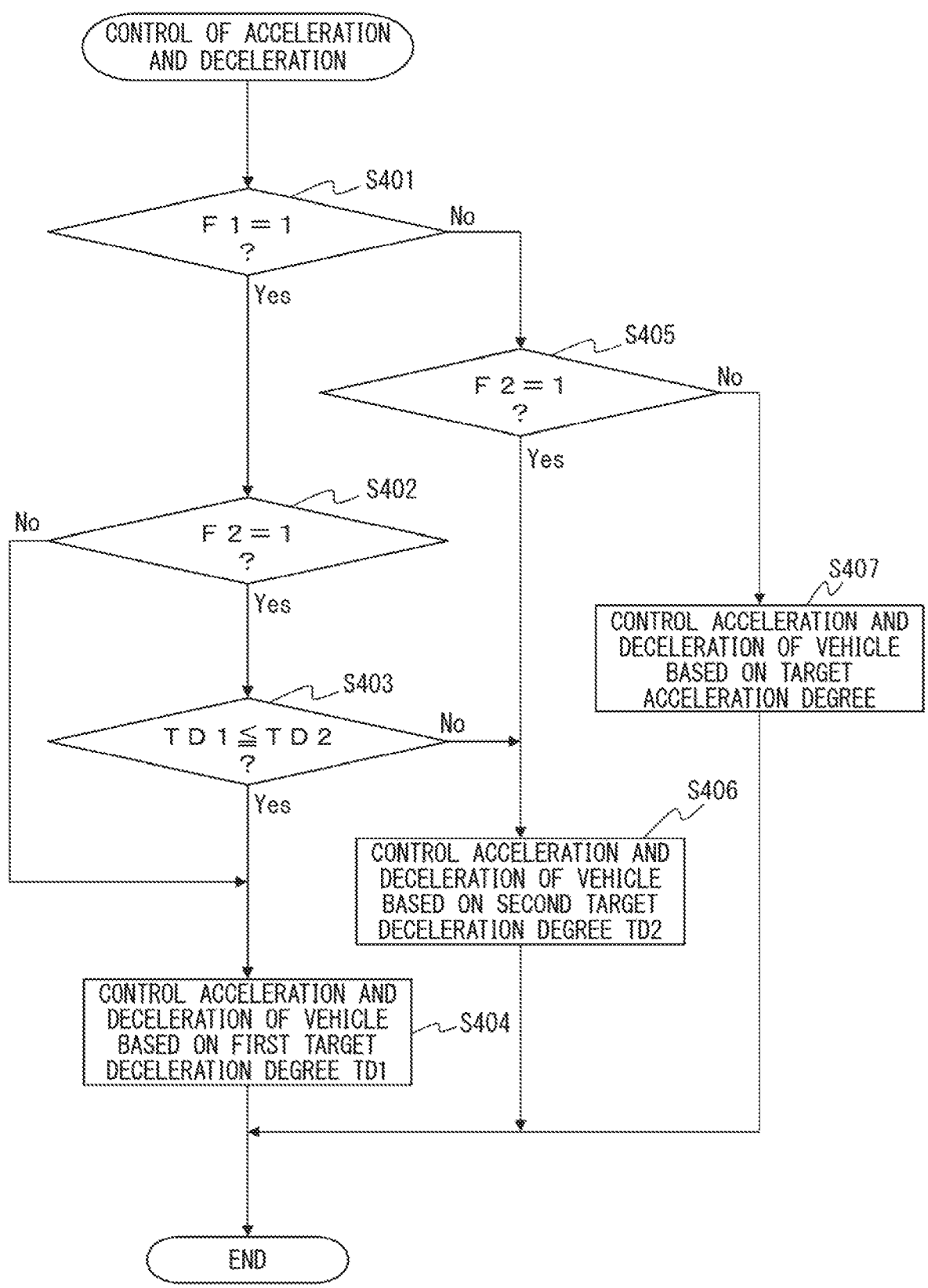
FIG. 8 is a flow chart showing a control routine of processing for control of acceleration and deceleration in the first embodiment.

FIG. 8 is a flow chart showing a control routine of control of acceleration and deceleration in the first embodiment. The present control routine is repeatedly performed at predetermined intervals by the ECU 10 while the vehicle 1 is being automatically driven.

First, at step S401, the vehicle control part 15 judges whether the first braking flag F1 is "1". If it is judged that the first braking flag F1 is "1", the present control routine proceeds to step S402.

At step S402, the vehicle control part 15 judges whether the second braking flag F2 is "1". If it is judged that the second braking flag F2 is "1", the present control routine proceeds to step S403.

At step S403, the vehicle control part 15 judges whether the first target deceleration degree TD1 is equal to or less than the second target deceleration degree TD2. If it is judged that the first target deceleration degree TD1 is equal to or less than the second target deceleration degree TD2, the present control routine proceeds to step S404. Further, if at step S402 it is judged that the second braking flag F2 is zero, the present control routine skips step S403 and proceeds to step S404.

At step S404, the vehicle control part 15 controls acceleration and deceleration of the vehicle 1 based on the first target deceleration degree TD1. Specifically, the vehicle control part 15 brakes the vehicle 1 using actuators 7 so that the deceleration degree of the vehicle 1 becomes the first target deceleration degree TD1. After step S404, the present control routine ends.

On the other hand, if at step S403 it is judged that the first target deceleration degree TD1 is larger than the second target deceleration degree TD2, the present control routine proceeds to step S406. At step S406, the vehicle control part 15 controls acceleration and deceleration of the vehicle 1 based on the second target deceleration degree TD2. Specifically, the vehicle control part 15 brakes the vehicle 1 using the actuators 7 so that the deceleration degree of the vehicle 1 becomes the second target deceleration degree TD2. After step S406, the present control routine ends.

Further, if at step S401 it is judged that the first braking flag F1 is zero, the present control routine proceeds to step S405. At step S405, the vehicle control part 15 judges whether the second braking flag F2 is 1. If it is judged that the second braking flag F2 is 1, the present control routine proceeds to step S406.

At step S406, as explained above, the vehicle control part 15 controls acceleration and deceleration of the vehicle 1 based on the second target deceleration degree TD2. After step S406, the present control routine ends.

On the other hand, if at step S405 it is judged that the second braking flag F2 is zero, the present control routine proceeds to step S407. At step S407, the vehicle control part 15 controls acceleration and deceleration of the vehicle 1 based on the target acceleration degree TA. Specifically, the vehicle control part 15 controls acceleration and deceleration of the vehicle 1 using the actuators 7 so that the acceleration degree of the vehicle 1 becomes the target acceleration degree TA.

If the target acceleration degree TA is calculated at step S103 of FIG. 5A, the first following control is performed by the vehicle control part 15, while if the target acceleration degree TA is calculated at step S106 of FIG. 5B, the second following control is performed by the vehicle control part 15. Further, if the target acceleration degree TA is calculated at step S104 of FIG. 5A or step S107 of FIG. 5B, constant speed control is performed by the vehicle control part 15. After step S407, the present control routine ends.

Second Embodiment

The driving assistance device according to the second embodiment is basically similar in configuration and control to the driving assistance device according to the first embodiment except for the points explained below. For this reason, below, the second embodiment of the present disclosure will be explained centered on parts different from the first embodiment.

As explained above, the vehicle control part 15 brakes the vehicle 1 when a predetermined parameter determined based on the relative relationship between the vehicle 1 and the first preceding vehicle is equal to or less than the threshold value. However, when a lane change of the vehicle 1 is performed, the vehicle 1 moves so as to be laterally displaced with respect to the first preceding vehicle. For this reason, at the time of a lane change, there is no need to secure the same following distance with respect to the first preceding vehicle as when following the first preceding vehicle.

For this reason, in the second embodiment, the threshold value during the lane change is made smaller than the threshold value before the lane change. By doing this, during the lane change, the vehicle 1 becomes less likely to brake with respect to the first preceding vehicle. As a result, it is possible to keep natural acceleration at the time of a lane change from being obstructed due to braking of the vehicle 1.

In the second embodiment, in the same way as the first embodiment, the control routine of FIG. 5A, FIG. 5B, FIG. 7, and FIG. 8 is performed. On the other hand, in the second embodiment, as processing for calculating the first target deceleration degree, instead of the control routine of FIG. 6, the control routine of FIG. 9 is performed.

<Processing for Calculating First Target Deceleration Degree>

Figure 9:
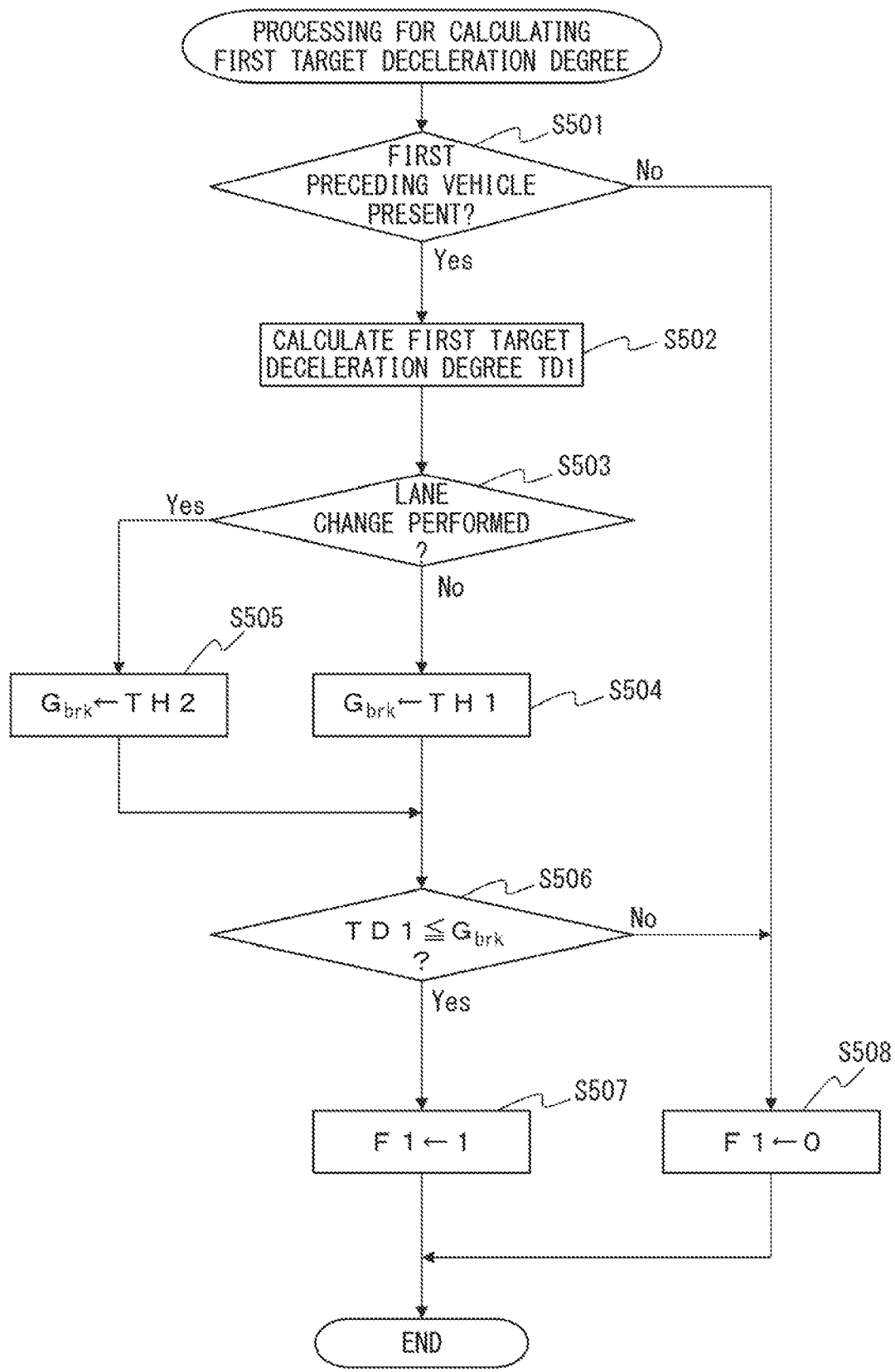
FIG. 9 is a flow chart showing a control routine of processing for calculating a first target deceleration degree in a second embodiment.

FIG. 9 is a flow chart showing a control routine of processing for calculating the first target deceleration degree in the second embodiment. The present control routine is repeatedly performed at predetermined intervals by the ECU 10 while the vehicle 1 is being automatically driven.

Steps S501 and S502 are performed in the same way as steps S201 and S202 of FIG. 6. After step S502, at step S503, the target deceleration degree calculating part 17, in the same way as step S101 of FIG. 5A, judges whether a lane change of the vehicle 1 is being performed. If it is judged that a lane change is not being performed, the present control routine proceeds to step S504.

At step S504, the target deceleration degree calculating part 17 sets the threshold value $G_{brk}$ to the first threshold value TH1. The first threshold value TH1 is determined as a negative value in advance considering the braking performance of the vehicle 1 etc. The first threshold value TH1 is set to the same value as the threshold value $G_{brk}$ used for judging whether braking with respect to the second preceding vehicle is necessary at step S203 of FIG. 6.

On the other hand, if at step S503 it is judged that a lane change is being performed, the present control routine proceeds to step S505. At step S505, the target deceleration degree calculating part 17 sets the threshold value $G_{brk}$ to a second threshold value TH2. The second threshold value TH2 is determined in advance as a value smaller than the first threshold value TH1.

After step S504 or step S505, at step S506, the target deceleration degree calculating part 17 judges whether the first target deceleration degree TD1 is equal to or less than the threshold value $G_{brk}$ set at step S504 or step S505. If it is judged that the first target deceleration degree TD1 is equal to or less than the threshold value $G_{brk}$, the present control routine proceeds to step S507 where the first braking flag F1 is set to "1". On the other hand, if it is judged that the first target deceleration degree TD1 is larger than the threshold value $G_{brk}$, the present control routine proceeds to step S508 where the first braking flag F1 is set to zero. After step S507 or step S508, the present control routine ends.

Third Embodiment

The driving assistance device according to the third embodiment is basically similar in configuration and control to the driving assistance device according to the first embodiment except for the points explained below. For this reason, below, the third embodiment of the present disclosure will be explained centered on parts different from the first embodiment.

Figure 10:
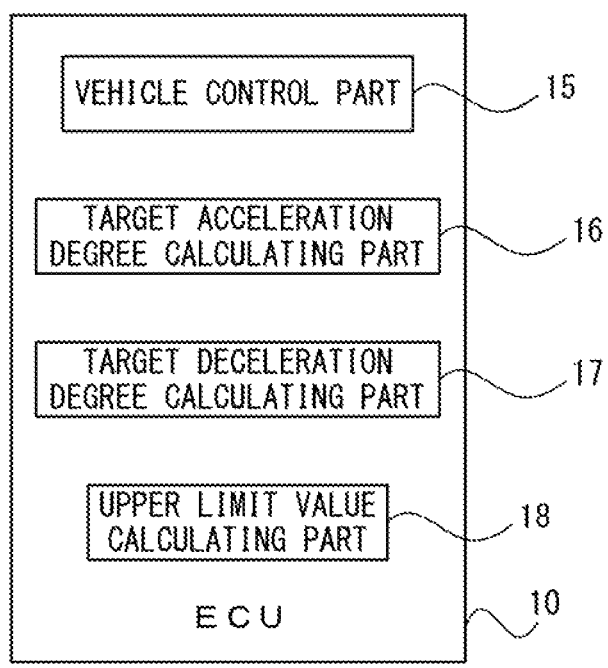
FIG. 10 is a functional block diagram of an ECU in a third embodiment.

FIG. 10 is a functional block diagram of the ECU 10 in the third embodiment. In the third embodiment, the ECU 10 has the vehicle control part 15, the target acceleration degree calculating part 16, and the target deceleration degree calculating part 17 plus an upper limit value calculating part 18. The vehicle control part 15, the target acceleration degree calculating part 16, the target deceleration degree calculating part 17, and the upper limit value calculating part 18 are functional modules realized by a program stored in the memory 12 of the ECU 10 being run by the processor 13 of the ECU 10.

As explained above, if and a lane change of the vehicle 1 is performed when there is a second preceding vehicle, the vehicle control part 15 performs second following control controlling acceleration and deceleration of the vehicle 1 so that the vehicle 1 follows the second preceding vehicle. On the other hand, the vehicle control part 15 brakes the vehicle 1 when a predetermined parameter determined based on the relative relationship between the vehicle 1 and the first preceding vehicle becomes equal to or less than the threshold value. For this reason, when making the vehicle 1 accelerate for following the second preceding vehicle, the vehicle 1 has to be braked with respect to the first preceding vehicle, and thus the acceleration of the vehicle 1 is liable to be suspended during the lane change.

Therefore, in the third embodiment, the upper limit value calculating part 18 calculates the upper limit value of the target acceleration degree of the vehicle 1, and the target acceleration degree calculating part 16 limits the target acceleration degree of the vehicle 1 at the second following control to the upper limit value. Due to this, it is possible to keep from braking with respect to the first preceding vehicle when performing the second following control, and in turn it is possible to keep from unnaturally accelerating during the lane change.

For example, the upper limit value calculating part 18 calculates the allowable limit value based on the following distance between the vehicle 1 and the first preceding vehicle at the time of start of a lane change and the relative speed of the vehicle 1 and the first preceding vehicle so that, during the lane change, the vehicle 1 is not braked with respect to the first preceding vehicle, and calculates the upper limit value as a value equal to or less than the allowable limit value.

In the present embodiment, the vehicle control part 15 brakes the vehicle 1 with respect to the first preceding vehicle when the first target deceleration degree calculated by the target deceleration degree calculating part 17 becomes equal to or less than the threshold value. For this reason, the upper limit value calculating part 18 calculates the allowable limit value based on the following distance between the vehicle 1 and the first preceding vehicle at the time of start of a lane change and the relative speed of the vehicle 1 and the first preceding vehicle so that the minimum value of the first target deceleration degree during the lane change becomes larger than the threshold value.

If making the vehicle 1 accelerate during the lane change, it is considered that the first target deceleration degree (negative value) becomes the minimum right before the vehicle 1 moves to the destination lane. For this reason, in the present embodiment, the upper limit value calculating part 18 calculates the allowable limit value so that the estimated value of the first target deceleration degree when the front end part of the vehicle 1 reaches the lane boundary line (below, referred to as the "first point of time") becomes larger than the threshold value.

As explained above, the threshold value $G_{brk}$ is determined in advance as a negative value considering the braking performance of the vehicle 1 etc. Further, the estimated value of the first target deceleration degree at the first point of time is expressed by the left side of the following formula (6). Therefore, the upper limit value calculating part 18 calculates the allowable limit value so that an inequality of the following formula (6) is satisfied:

$$-1.0 \cdot \Delta V_1 \cdot |\Delta V_1| / \{\alpha \cdot (\Delta d_1 - d_{low})\} > G_{brk} \quad (6)$$

Here, $\alpha$ and $d_{low}$ are, as explained above relating to the above formula (4), respectively a predetermined coefficient determined in accordance with the mode of deceleration of the vehicle 1 and the lowest following distance. $\Delta V_1$ is the relative speed of the vehicle 1 and the first preceding vehicle (speed of vehicle 1−speed of first preceding vehicle) at the first point of time and is calculated by the following formula (7). $\Delta d_1$ is the following distance between the vehicle 1 and the first preceding vehicle at the first point of time and is calculated by the following formula (8).

$$\Delta V_1 = \{(a_0 + a_1)/2\} \cdot \Delta t + \Delta V_0 \quad (7)$$

$$\Delta d_1 = \Delta d_0 - \Delta V_0 \cdot \Delta t - (1/2) \cdot \{(a_0 + a_1)/2\} \cdot \Delta t^2 \quad (8)$$

Here, $\Delta V_0$ is the relative speed of the vehicle 1 and the first preceding vehicle (speed of vehicle 1−speed of first preceding vehicle) at the time of start of the lane change. $a_0$ is the acceleration degree of the vehicle 1 at the time of start of the lane change, while $a_1$ is the acceleration degree of the vehicle 1 at the first point of time. $\Delta d_0$ is the following distance between the vehicle 1 and the first preceding vehicle at the time of start of lane change.

The $\Delta t$ at the above formula (7) and formula (8) is the time from when a lane change is started to when the vehicle 1 moves to the destination lane, for example, the time from when a lane change is started until the front end part of the vehicle 1 reaches the lane boundary line. At is determined in advance as a constant and is, for example, 4 seconds to 8 seconds.

If assuming that the relative speed $\Delta V_1$ is greater than zero and setting $\beta = (a_0 + a_1)/2$, the following formula (9) is derived from the above formula (6) to formula (8). Further, if entering the value of the above-mentioned p into the following formula (9), the following formula (9) is converted to the following formula (10):

[Mathematical 1]

$$\beta < \frac{G_{brk} \alpha \Delta t^2 - 4\Delta V_0 \Delta t + \sqrt{G_{brk}^2 \alpha^2 \Delta t^2 + 8 G_{brk} \alpha \Delta V_0 \Delta t^3 - 16 G_{brk} \alpha (\Delta d_0 - d_{low}) \Delta t^2}}{4\Delta t^2} \quad (9)$$

[Mathematical 2]

$$a_1 < \frac{G_{brk} \alpha \Delta t^2 - 4\Delta V_0 \Delta t + \sqrt{G_{brk}^2 \alpha^2 \Delta t^4 + 8 G_{brk} \alpha \Delta V_0 \Delta t^3 - 16 G_{brk} \alpha (\Delta d_0 - d_{low}) \Delta t^2}}{2\Delta t^2} - a_0 \quad (10)$$

The variables at the right side of the above formula (10) are only the relative speed $\Delta V_0$ at the time of start of a lane change and the following distance $\Delta d_0$ at the time of start of a lane change. For this reason, the upper limit value calculating part 18 enters the relative speed and the following distance at the time of start of a lane change into the right side of the above formula (10) and calculates the maximum value of the acceleration degree $a_1$ satisfying the above formula (10) as the allowable limit value.

If the allowable limit value calculated in the above way is used as the target acceleration degree of the vehicle 1 in the second following control, basically, it is not necessary to brake the vehicle 1 to avoid collision with the first preceding vehicle during the lane change. However, if the vehicle 1 rapidly approaches the first preceding vehicle along with the start of a lane change, the driver of the vehicle 1 is liable to become apprehensive.

Normally, the driver hesitates from rapid acceleration at the time of a lane change the closer the vehicle 1 to the first preceding vehicle. Further, as the vehicle 1 slides in the lateral direction with respect to the first preceding vehicle due to a lane change, the danger of collision between the vehicle 1 and the first preceding vehicle falls. For this reason, in the present embodiment, the upper limit value calculating part 18 calculates the upper limit value as a value equal to or less than the allowable limit value and changes the difference between the allowable limit value and the upper limit value based on the following distance between the vehicle 1 and the first preceding vehicle and lateral position of the vehicle 1 during the lane change. Due to this, it is possible to give the driver an increased sense of security when a lane change is performed by automated driving. Note that, the "lateral position of the vehicle 1" means the position of the vehicle 1 in the width direction of the running lane of the vehicle 1.

For example, the upper limit value calculating part 18 determines a suppression gain (0 to 1) based on the following distance between the vehicle 1 and the first preceding vehicle and lateral position of the vehicle 1 during the lane change, and multiplies the suppression gain with the allowable limit value to calculate the upper limit value (upper limit value=allowable limit value×suppression gain). The value of the suppression gain is made larger the longer the following distance, and the lateral position of the vehicle 1 is made larger the closer to the destination lane.

<Processing for Calculating Upper Limit Value>

Figure 11:
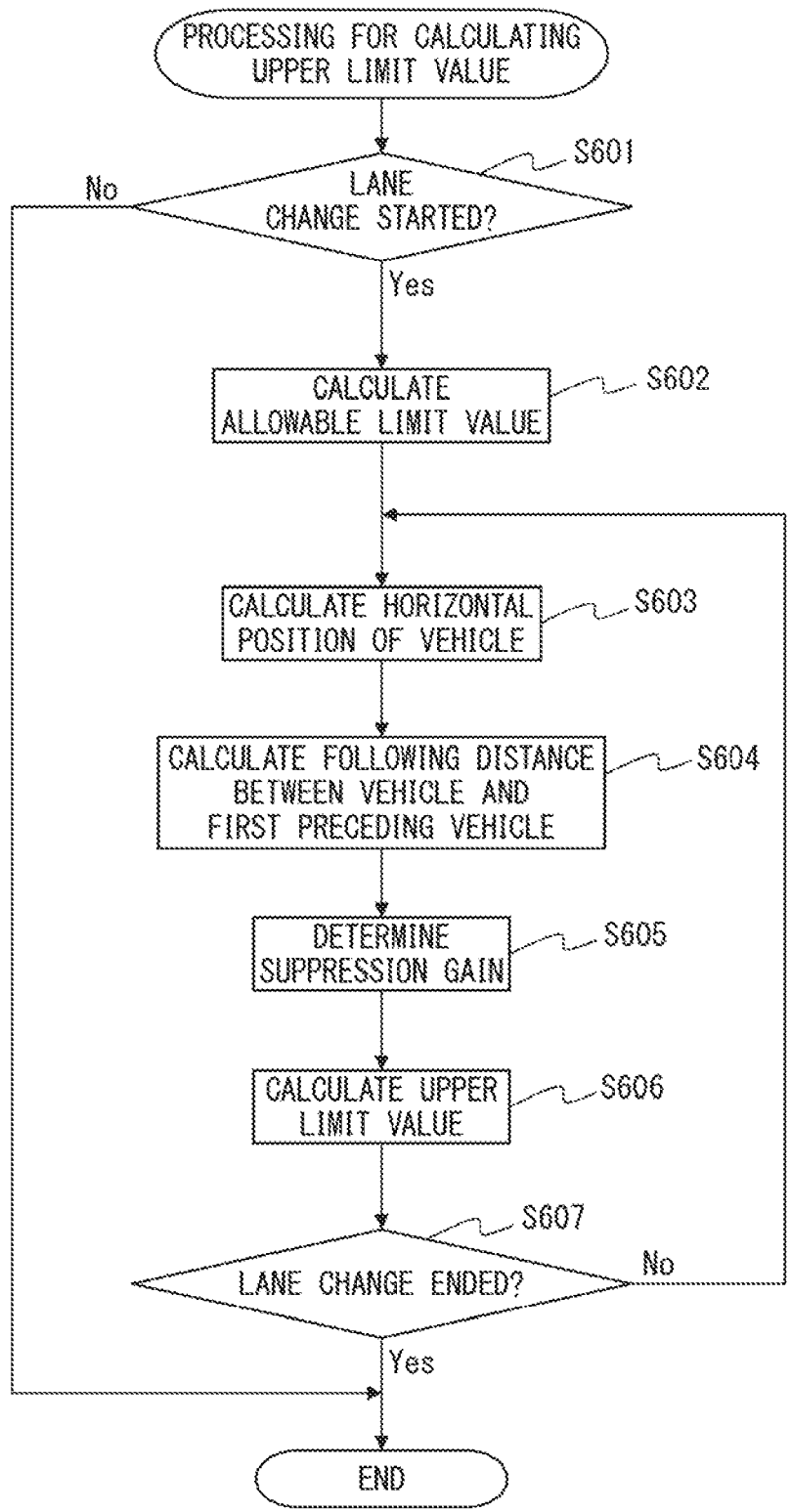
FIG. 11 is a flow chart showing a control routine of processing for calculating an upper limit value in the third embodiment.

FIG. 11 is a flow chart showing a control routine of processing for calculating an upper limit value in a third embodiment. The present control routine is repeatedly performed by the ECU 10 while the vehicle 1 is being automatically driven.

First, at step S601, the upper limit value calculating part 18 judges whether a lane change of the vehicle 1 has started. For example, the upper limit value calculating part 18 judges that a lane change has started when the driver authorizes a lane change through the input/output device 8, when a turn signal of the vehicle 1 is operated for a lane change, when the start of a lane change is notified to the driver through the input/output device 8, or when a steering operation for a lane change is started by the vehicle control part 15.

If at step S601 it is judged that a lane change has not been started, the present control routine ends. On the other hand, if it is judged that a lane change has been started, the present control routine proceeds to step S602.

At step S602, the upper limit value calculating part 18 calculates the allowable limit value based on the following distance between the vehicle 1 and the first preceding vehicle at the time of start of a lane change and the relative speed of the vehicle 1 and the first preceding vehicle. For example, as explained above, the upper limit value calculating part 18 calculates the maximum value of the acceleration degree $a_1$ satisfying the above formula (10) as the allowable limit value. Note that, the upper limit value calculating part 18 may calculate the allowable limit value using a map showing the relationship between the following distance between the vehicle 1 and the first preceding vehicle at the time of start of lane change, the relative speed of the vehicle 1 and the first preceding vehicle, and the allowable limit value.

Next, at step S603, the upper limit value calculating part 18 calculates the lateral position of the vehicle 1. For example, the upper limit value calculating part 18 calculates the lateral position of the vehicle 1 as the offset rate with respect to the lane center line of the original lane.

Figure 12:
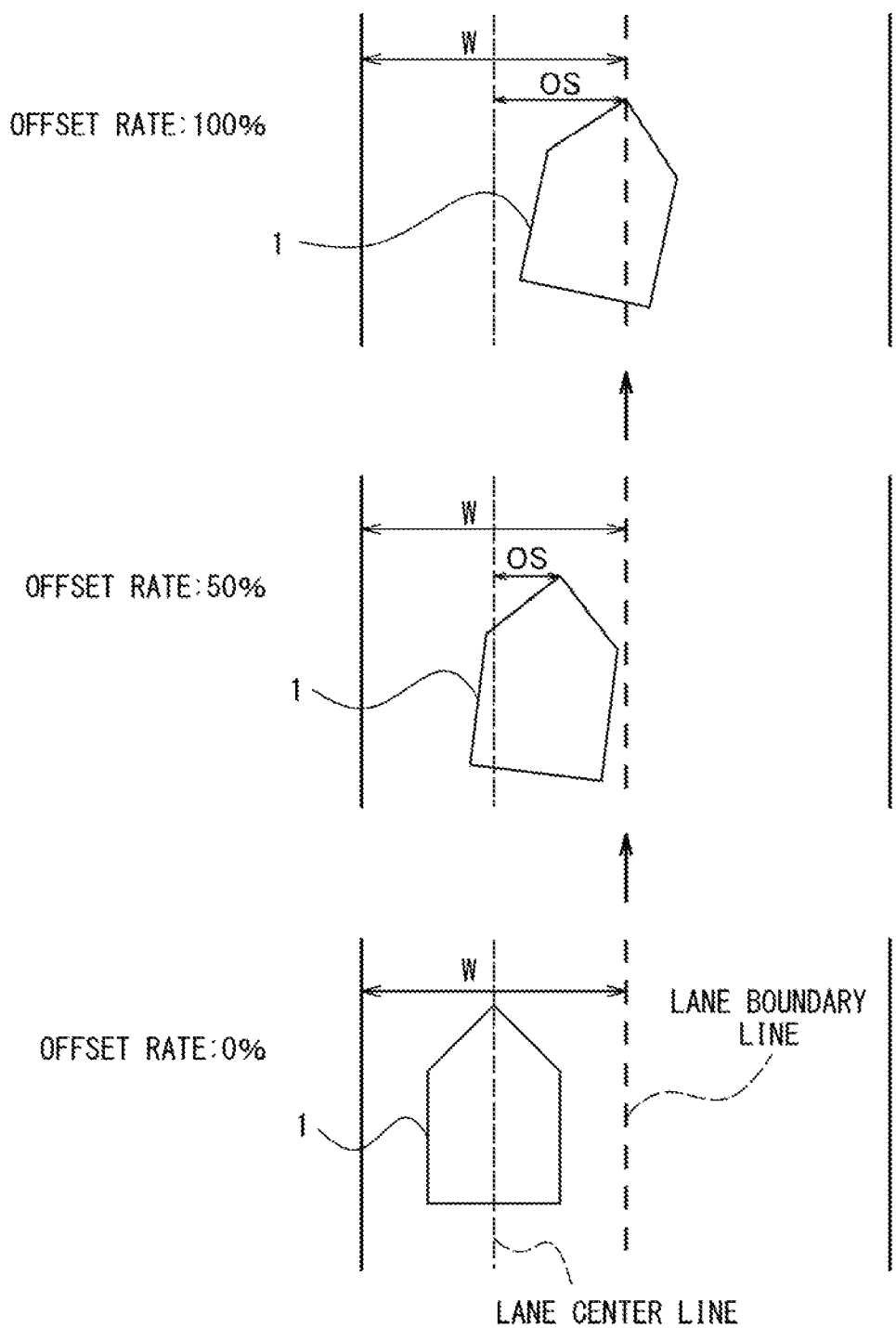
FIG. 12 is a view schematically showing a trend in an offset rate at the time of a lane change.

FIG. 12 is a view schematically showing the trend in the offset rate at the time of a lane change. The offset rate OSR is calculated by the following formula (11) based on the width W of the original lane and the offset amount OS with respect to the lane center line of the original lane. The offset amount OS, for example, as shown in FIG. 12, is calculated as the distance between the lane center line and the front end part of the vehicle 1.

$$OSR(\%)=(2 \cdot OS/W) \cdot 100 \tag{11}$$

The width W of the lane is, for example, acquired from the map information stored in the map database 5 or calculated based on the white line information detected by the object detection device 2. The offset amount OS, for example, is calculated based on the positional relationship between the lane boundary line detected by the object detection device 2 and the vehicle 1.

When a lane change is not being performed, the steering of the vehicle 1 is controlled so that the front end part of the vehicle 1 (center position in lateral direction) is positioned on the lane center line. For this reason, at the time of start of the lane change, the offset amount OS becomes zero, and as a result, the offset rate OSR becomes 0%. After that, as the vehicle 1 approaches the destination lane due to the lane change, the offset rate becomes higher. When the front end part of the vehicle 1 reaches the lane boundary line, the offset rate becomes 100%.

After step S603, at step S604, the upper limit value calculating part 18 calculates the following distance between the vehicle 1 and the first preceding vehicle based on the output of the object detection device 2.

Figure 13:
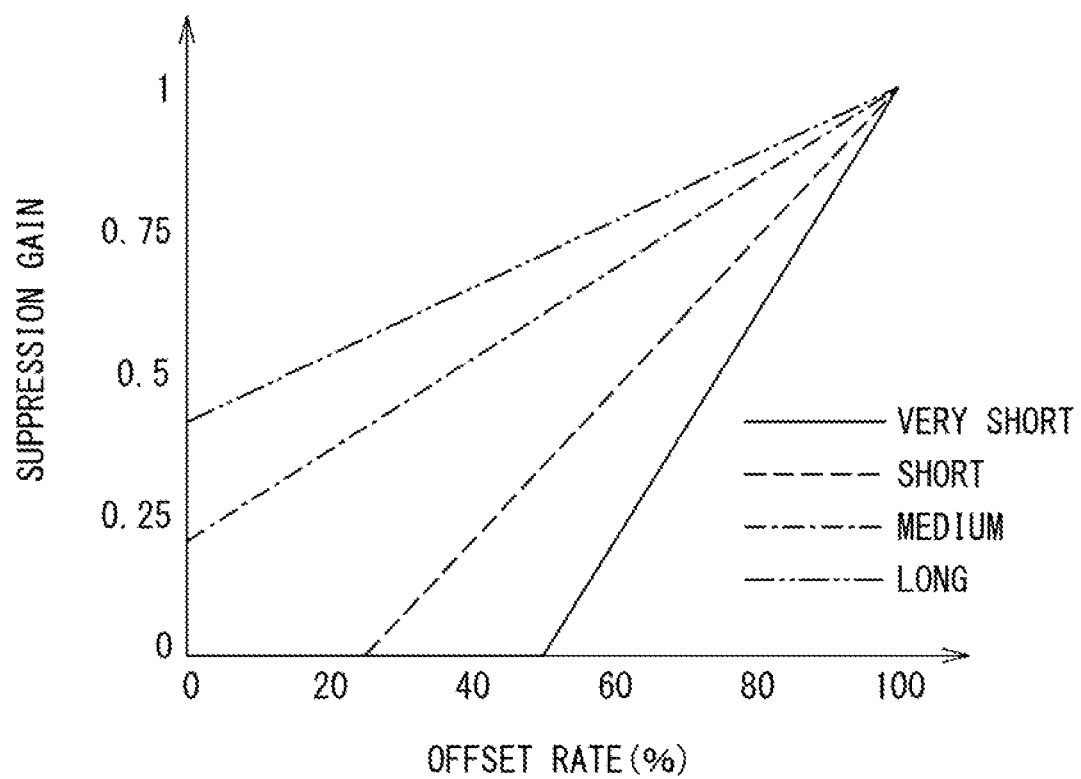
FIG. 13 is a view showing an example of a map for determining a suppression gain based on a lateral position of a vehicle and a following distance between the vehicle and a first preceding vehicle.

Next, at step S605, the upper limit value calculating part 18 determines the suppression gain based on the lateral position of the vehicle 1 and the following distance between the vehicle 1 and the first preceding vehicle. For example, the following distance between the vehicle 1 and the first preceding vehicle is classified into four ranges of long, medium, short, and extremely short, in descending order of distance, in accordance with the value. Further, the upper limit value calculating part 18 determines the suppression gain using a map such as shown in FIG. 13. In such a map, the value of the suppression gain is made larger the longer the following distance and is made larger the higher the offset rate.

Note that, in the map for determining the suppression gain, the value of the following distance between the vehicle 1 and the first preceding vehicle itself may also be used. Further, the lateral position of the vehicle 1 may be calculated as the distance between the lane center line and the front end part of the vehicle 1 or the center of gravity instead of the offset rate.

Next, at step S606, the upper limit value calculating part 18 multiplies the suppression gain with the allowable limit value to calculate the upper limit value of the target acceleration degree (upper limit value=allowable limit value× suppression gain).

Next, at step S607, the upper limit value calculating part 18 judges whether the lane change of the vehicle 1 has ended. For example, the upper limit value calculating part 18 judges that the lane change has ended when the front end part of the vehicle 1 reaches the lane boundary line, when the vehicle 1 as a whole enters the destination lane, when the steering operation for the lane change by the vehicle control part 15 ends, or when the turn signal of the vehicle 1 is stopped.

If at step S607, it is judged that the lane change has not ended, the present control routine returns to step S603. At steps S603 to S606, the suppression gain and the upper limit value are updated. On the other hand, if at step S607 it is judged that the lane change has ended, the present control routine ends.

Note that, step S603 may be omitted and, at step S605, the upper limit value calculating part 18 may determine the suppression gain based on the following distance between the vehicle 1 and the first preceding vehicle. That is, the upper limit value calculating part 18 may change the difference between the allowable limit value and the upper limit value based on the following distance between the vehicle 1 and the first preceding vehicle during the lane change.

Further, step S604 may be omitted and, at step S605, the upper limit value calculating part 18 may determine the suppression gain based on the lateral position of the vehicle 1. That is, the upper limit value calculating part 18 may change the difference between the allowable limit value and the upper limit value based on the lateral position of the vehicle 1 during the lane change.

Further, step S602 may be omitted and the allowable limit value used at step S606 may be a predetermined fixed value. Further, steps S603 to S605 may be omitted and, at step S606, the upper limit value calculating part 18 may set the allowable limit value to the upper limit value. That is, the upper limit value calculating part 18 may calculate the upper limit value based on the following distance between the vehicle 1 and the first preceding vehicle and the relative speed of the vehicle 1 and the first preceding vehicle at the time of start of lane change so that during the lane change, the vehicle 1 is not braked with respect to the first preceding vehicle.

<Processing for Calculating Target Acceleration Degree>

Figure 14:
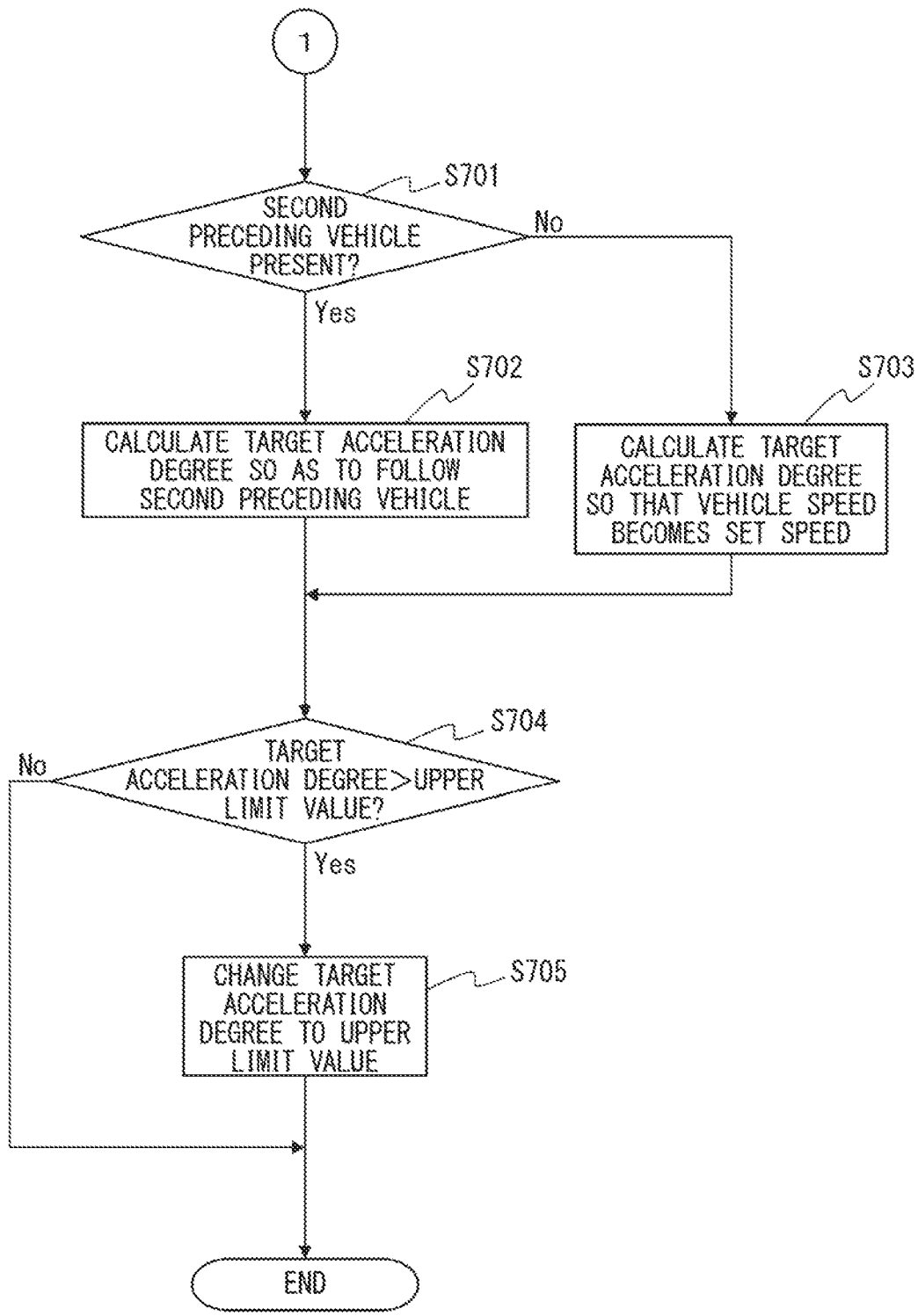
FIG. 14 is a flow chart showing a control routine of processing for calculating a target acceleration degree in the third embodiment.

Further, in the third embodiment, in the control routine of the processing for calculating the target acceleration degree, instead of steps S105 to S107 of FIG. 5B, steps S701 to S705 of FIG. 14 are performed.

Steps S701 to S703 are performed in the same way as steps S105 to S107 of FIG. 5B. After step S702 or step S703, the control routine proceeds to step S704. At step S704, the target acceleration degree calculating part 16 judges whether the target acceleration degree calculated at step S702 or S703 is larger than the upper limit value calculated by the upper limit value calculating part 18 in the control routine of FIG. 11. If it is judged that the target acceleration degree is equal to or less than the upper limit value, the present control routine ends.

On the other hand, if it is judged at step S704 that the target acceleration degree is larger than the upper limit value, the present control routine proceeds to step S705. At step S705, the target acceleration degree calculating part 16 changes the target acceleration degree to the upper limit value. That is, the target acceleration degree is limited to the upper limit value. After step S705, the present control routine ends.

Further, in the third embodiment, in the same way as the first embodiment, the control routine of FIG. 6 to FIG. 8 is performed.

Fourth Embodiment

The driving assistance device according to the fourth embodiment is basically similar in configuration and control to the driving assistance device according to the first embodiment except for the points explained below. For this reason, below, the fourth embodiment of the present disclosure will be explained centered on parts different from the first embodiment.

As explained above, if a lane change of the vehicle 1 is performed when there is a second preceding vehicle, the vehicle control part 15 performs the second following control controlling the acceleration and deceleration of the vehicle 1 so that the vehicle 1 follows the second preceding vehicle. At this time, the target acceleration degree calculating part 16 calculates the target acceleration degree of the vehicle 1 so that the following distance between the vehicle 1 and the second preceding vehicle becomes the target following distance.

However, sometimes a lane change of the vehicle 1 is demanded when the space between the second preceding vehicle and the vehicle following that is small. In this case, the lane change is started in the state where the following distance between the vehicle 1 and the second preceding vehicle is short. As a result, if the second following control is performed, rapid deceleration of the vehicle 1 is liable to be demanded together with start of the lane change.

Therefore, in the fourth embodiment, if the following distance between the vehicle 1 and the second preceding vehicle at the time of start of a lane change is less than a predetermined set following distance, the target acceleration degree calculating part 16 gradually increases the target following distance in the second following control from the following distance between the vehicle 1 and the second preceding vehicle at the time of start of a lane change to the set following distance. By doing this, even if the following distance with the second preceding vehicle at the time of start of a lane change is short, it is possible to avoid rapid deceleration of the vehicle 1 in the second following control.

<Processing for Setting Target Following Distance>

Figure 15:
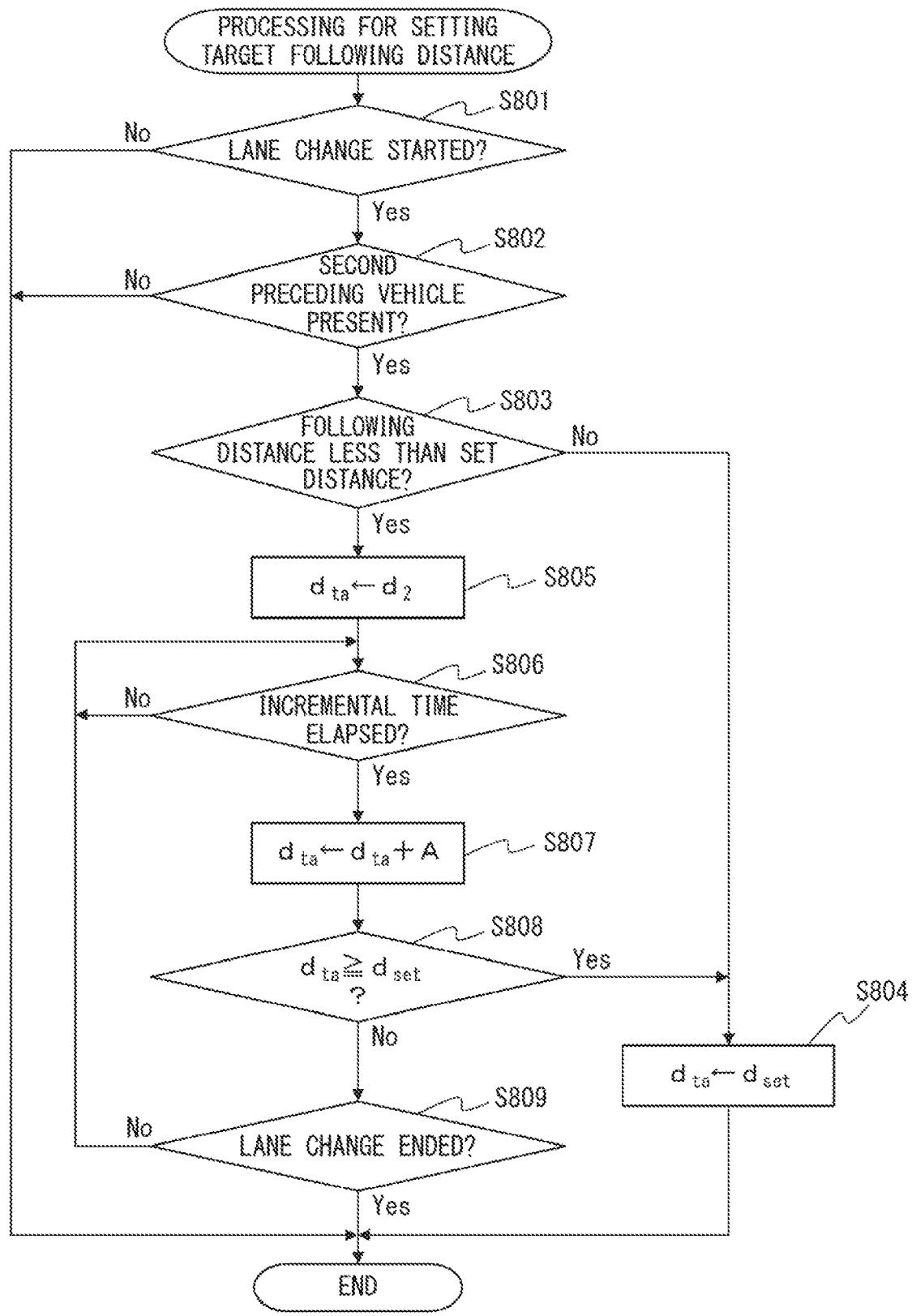
FIG. 15 is a flow chart showing a control routine of processing for setting a target following distance in a fourth embodiment.

FIG. 15 is a flow chart showing a control routine of processing for setting a target following distance in the fourth embodiment. The present control routine is repeatedly performed by the ECU 10 while the vehicle 1 is being automatically driven.

First, at step S801, the target acceleration degree calculating part 16, in the same way as step S601 of FIG. 11, judges whether a lane change of the vehicle 1 has been started. If it is judged that a lane change is not started, the present control routine ends. On the other hand, if it is judged that a lane change has been started, the present control routine proceeds to step S802.

At step S802, the target acceleration degree calculating part 16, in the same way as step S105 of FIG. 5B, judges whether there is a second preceding vehicle. If it is judged that there is no second preceding vehicle, the present control routine ends. On the other hand, if it is judged that there is a second preceding vehicle, the present control routine proceeds to step S803.

At step S803, the target acceleration degree calculating part 16 judges whether the following distance between the vehicle 1 and the second preceding vehicle is less than a predetermined set following distance. Regarding the above formula (1), as explained above, the set following distance is set in advance by the driver, is automatically set according to the speed of the vehicle 1 etc., or is a predetermined fixed value. If at step S803 it is judged that the following distance is equal to or greater than the set following distance, the present control routine proceeds to step S804.

At step S804, the target acceleration degree calculating part 16 sets the target following distance $d_{ta}$ to the set following distance $d_{set}$. After step S804, the present control routine ends.

On the other hand, if at step S803 it is judged that the following distance is less than the set following distance, the present control routine proceeds to step S805. At step S805, the target acceleration degree calculating part 16 sets the target following distance $d_{ta}$ to the current following distance $d_2$ between the vehicle 1 and the second preceding vehicle.

Next, at step S806, it is judged whether an incremental time has elapsed. The incremental time is predetermined and is, for example, 50 ms to 500 ms. If the incremental time elapses, the judgment at step S806 is affirmative and the present control routine proceeds to step S807.

At step S807, the target acceleration degree calculating part 16 adds a predetermined value A (for example, 1 m) to update the target following distance $d_{ta}$.

Next, at step S808, the target acceleration degree calculating part 16 judges whether the target following distance $d_{ta}$ is equal to or greater than the set following distance $d_{set}$. If it is judged that the target following distance $d_{ta}$ is less than the set following distance $d_{set}$, the present control routine proceeds to step S809.

At step S809, the target acceleration degree calculating part 16, in the same way as step S607 of FIG. 11, judges whether then lane change has ended. If it is judged that the lane change has not ended, the present control routine returns to step S806. At step S807, the target following distance $d_{ta}$ is made further longer.

When, as a result of updating, the target following distance $d_{ta}$ reaches the set following distance $d_{set}$, at step S808, it is judged that the target following distance $d_{ta}$ is equal to or greater than the set following distance $d_{set}$ and the present control routine proceeds to step S804. At step S804, the target acceleration degree calculating part 16 sets the target following distance $d_{ta}$ to the set following distance $d_{set}$. After step S804, the present control routine ends.

On the other hand, if the lane change ends before the target following distance $d_{ta}$ reaches the set following distance $d_{set}$, the judgment of step S809 is affirmative and the present control routine ends.

In the fourth embodiment, in the same way as the first embodiment, the control routine of FIG. 5A to FIG. 8 is performed. At this time, the value of the target following distance set by the control routine of FIG. 15 is used for calculating the target acceleration degree in the second following control at step S106 of FIG. 5B.

Other Embodiments

Above, preferred embodiments of the present disclosure were explained, but the present disclosure is not limited to these embodiments and can be corrected and changed in various ways within the language of the claims. For example, in a lane change by automated driving, the steering of the vehicle 1 may be operated by the driver of the vehicle 1 and only the acceleration and deceleration of the vehicle 1 may be controlled by the vehicle control part 15.

Further, the above-mentioned embodiments can be worked freely combined. For example, if the second embodiment and the third embodiment are combined, the second threshold value TH2 at step S505 of FIG. 9 is used as the value of the threshold value $G_{brk}$ in the above formulas (6), (9), and (10) and the control routine of FIG. 9 is performed instead of the control routine of FIG. 6 as the processing for calculating the first target deceleration degree.

Further, if the second embodiment or the third embodiment is combined with the fourth embodiment, in the second embodiment or the third embodiment, the target following distance in the second following control is calculated by the control routine of FIG. 15.

REFERENCE SIGNS LIST 1 vehicle
10 electronic control unit (ECU)
15 vehicle control part
C1 first preceding vehicle
C2 second preceding vehicle

The invention claimed is:

1. A driving assistance device comprising one or more processors configured to control operation of a host vehicle, wherein
   the one or more processors are configured to perform first following control controlling acceleration and deceleration of the host vehicle so that the host vehicle follows a first preceding vehicle running in front of the host vehicle in the same lane as the host vehicle, and perform second following control prohibiting the first following control while a lane change is being performed and controlling acceleration and deceleration of the host vehicle so that the host vehicle follows a second preceding vehicle running in front of the host vehicle in a destination lane, if the lane change of the host vehicle is started during the first following control,
   the one or more processors are configured to brake the host vehicle when a target deceleration degree determined based on a relative relationship between the host vehicle and the first preceding vehicle becomes equal to or less than a target deceleration degree threshold value, and
   the target deceleration degree threshold value during the lane change is smaller than the target deceleration degree threshold value before the lane change.

2. The driving assistance device according to claim 1, wherein the one or more processors are configured to:
   calculate a target acceleration degree of the host vehicle;
   calculate an upper limit value of the target acceleration degree;
   limit the target acceleration degree at the second following control to a value equal to or less than the upper limit value; and
   control acceleration and deceleration of the host vehicle so that the acceleration degree of the host vehicle becomes the target acceleration degree.

3. The driving assistance device according to claim 2, wherein the one or more processors are configured to calculate an allowable limit value based on a following distance between the host vehicle and the first preceding vehicle and a relative speed of the host vehicle and the first preceding vehicle at the time of start of a lane change so that the host vehicle is not braked with respect to the first preceding vehicle during the lane change, and calculate the upper limit value as a value equal to or less than the allowable limit value.

4. The driving assistance device according to claim 3, wherein the one or more processors are configured to change a difference between the allowable limit value and the upper limit value based on a following distance between the host vehicle and the first preceding vehicle during the lane change.

5. The driving assistance device according to claim 3, wherein the one or more processors are configured to change a difference between the allowable limit value and the upper limit value based on a lateral position of the host vehicle during the lane change.

6. The driving assistance device according to claim 1, wherein the one or more processors are configured to:
calculate a target acceleration degree of the host vehicle;
control acceleration and deceleration of the host vehicle so that the acceleration degree of the host vehicle becomes the target acceleration degree; and
calculate the target acceleration degree so that a following distance between the host vehicle and the second preceding vehicle becomes a target following distance in the second following control, and if the following distance between the host vehicle and the second preceding vehicle at the time of start of the lane change is less than a predetermined set following distance, gradually increase the target following distance at the second following control from the following distance between the host vehicle and the second preceding vehicle at the time of start of the lane change to the predetermined set following distance.

* * * * *